(12) United States Patent
Suzuki et al.

(10) Patent No.: US 11,527,926 B2
(45) Date of Patent: Dec. 13, 2022

(54) RECEIVER, RECEPTION METHOD, TRANSMITTER AND TRANSMISSION METHOD

(71) Applicant: Sony Group Corporation, Tokyo (JP)

(72) Inventors: Katsuya Suzuki, Tokyo (JP);
Masayoshi Murata, Tokyo (JP);
Shutaro Okamura, Tokyo (JP);
Tasuku Inui, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 12 days.

(21) Appl. No.: 17/057,699

(22) PCT Filed: Jan. 11, 2019

(86) PCT No.: PCT/JP2019/000610
§ 371 (c)(1),
(2) Date: Nov. 23, 2020

(87) PCT Pub. No.: WO2019/230034
PCT Pub. Date: Dec. 5, 2019

(65) Prior Publication Data
US 2021/0194293 A1    Jun. 24, 2021

(30) Foreign Application Priority Data
May 31, 2018    (JP) .............................. JP2018-104521

(51) Int. Cl.
*H02J 50/90* (2016.01)
*H02J 50/80* (2016.01)
(Continued)

(52) U.S. Cl.
CPC .............. *H02J 50/90* (2016.02); *H02J 50/20* (2016.02); *H02J 50/60* (2016.02); *H02J 50/80* (2016.02)

(58) Field of Classification Search
CPC ...... H02J 50/20–27; H02J 50/60; H02J 50/80; H02J 50/90
See application file for complete search history.

(56) References Cited

U.S. PATENT DOCUMENTS 10,333,357 B1 *  6/2019  Abu Qahouq .......... H02J 50/40
2002/0190689 A1 * 12/2002  Nakamura ............. H01Q 1/248
                                                                320/102
(Continued)

FOREIGN PATENT DOCUMENTS

JP    2014212660 A    11/2014
JP    2015-12713 A     1/2015
(Continued)

OTHER PUBLICATIONS

International Search Report and Written Opinion dated Feb. 26, 2019, received for PCT Application No. PCT/JP2019/000610, filed on Jan. 11, 2019, 11 pages including English Translation.

*Primary Examiner* — Rexford N Barnie
*Assistant Examiner* — David A Shiao
(74) *Attorney, Agent, or Firm* — Xsensus LLP

(57) ABSTRACT

It is desirable to provide a technology which is capable of improving charging efficiency and reducing a possibility that power may affect a human body upon wireless power feeding.
There is provided a receiver including a wireless communication unit configured to receive a radio wave transmitted from a transmitter; a display control unit configured to control display of at least one of receiving strength of the radio wave transmitted from the transmitter, at the wireless communication unit or predetermined information in accordance with the receiving strength; and a contactless communication unit configured to receive power wirelessly (Continued)

transmitted from the transmitter in a case where the receiving strength exceeds a threshold.

15 Claims, 13 Drawing Sheets

(51) Int. Cl.
  *H02J 50/60* (2016.01)
  *H02J 50/20* (2016.01)

(56) References Cited

U.S. PATENT DOCUMENTS

| | | | |
|---|---|---|---|
| 2013/0214744 A1 | 8/2013 | Kang | |
| 2014/0176054 A1* | 6/2014 | Porat | H02J 50/12 |
| | | | 320/108 |
| 2015/0171512 A1 | 6/2015 | Chen et al. | |
| 2015/0340875 A1 | 11/2015 | Prasad | |
| 2016/0033254 A1 | 2/2016 | Zeine | |
| 2016/0181854 A1* | 6/2016 | Leabman | H02J 50/15 |
| | | | 320/108 |
| 2016/0183056 A1* | 6/2016 | Leabman | H02J 50/20 |
| | | | 455/456.3 |
| 2017/0063170 A1 | 3/2017 | Harper | |
| 2017/0085112 A1 | 3/2017 | Leabman | |
| 2017/0288475 A1* | 10/2017 | Lee | H04L 5/0048 |
| 2017/0358950 A1* | 12/2017 | Zeine | H02J 50/23 |
| 2018/0183259 A1* | 6/2018 | Lee | H02J 50/90 |
| 2018/0241255 A1* | 8/2018 | Leabman | H02J 50/23 |
| 2019/0006891 A1* | 1/2019 | Park | H04W 4/80 |
| 2019/0348870 A1* | 11/2019 | Miwa | H02J 50/20 |
| 2019/0372399 A1* | 12/2019 | Park | H01Q 3/30 |
| 2020/0083752 A1* | 3/2020 | Bohn | H02J 50/60 |

FOREIGN PATENT DOCUMENTS

| | | |
|---|---|---|
| JP | 2015523842 A | 8/2015 |
| JP | 2017-139952 A | 8/2017 |
| JP | 2017-209011 A | 11/2017 |
| WO | WO-2017066629 A1 | 4/2017 |
| WO | WO-2017106816 A1 | 6/2017 |

* cited by examiner

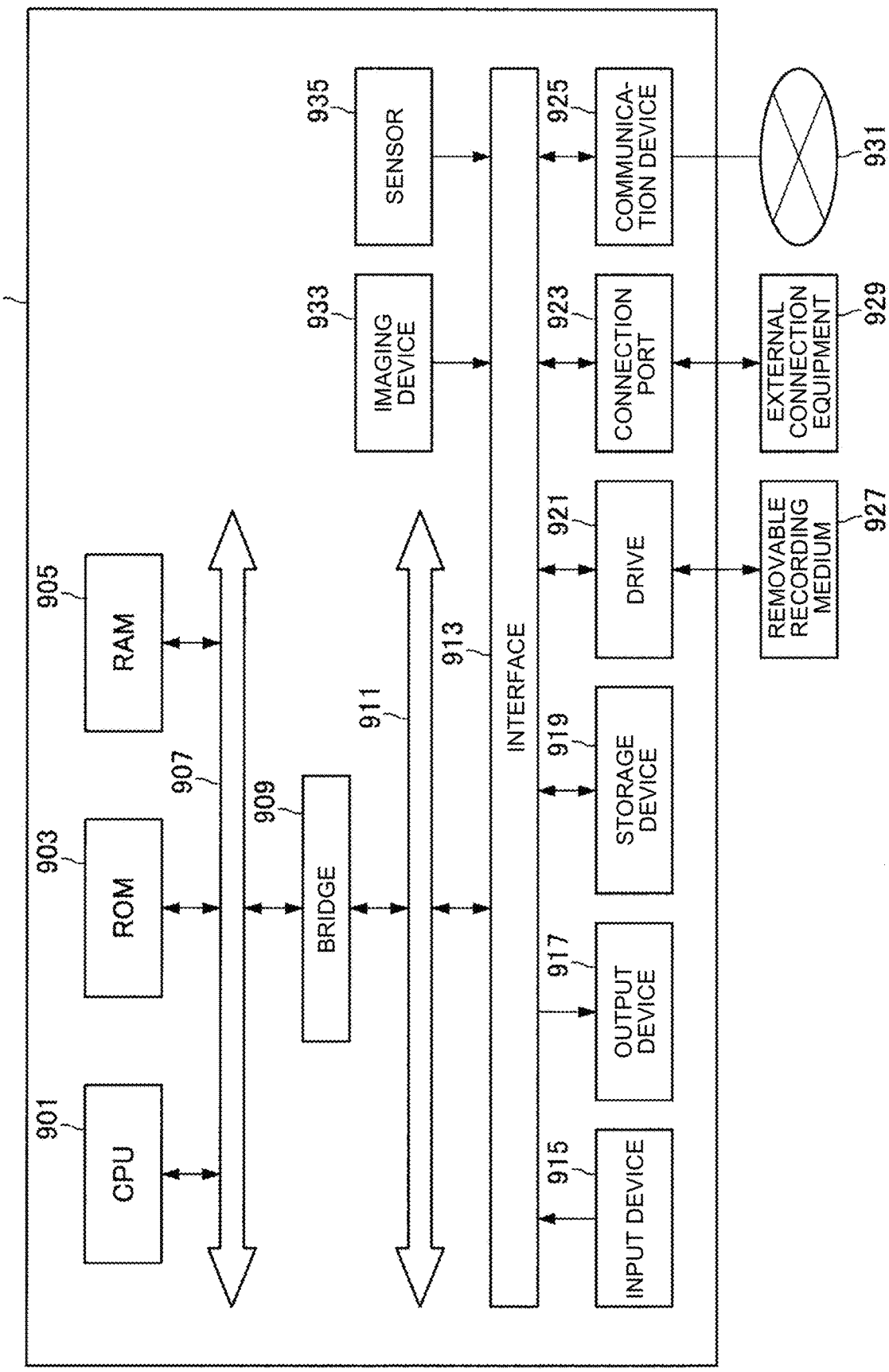

RECEIVER, RECEPTION METHOD, TRANSMITTER AND TRANSMISSION METHOD

CROSS-REFERENCE TO RELATED APPLICATIONS

The present application is based on PCT filing PCT/JP2019/000610, filed Jan. 11, 2019, which claims priority to JP 2018-104521, filed May 31, 2018, the entire contents of each are incorporated herein by reference.

FIELD

The present disclosure relates to a receiver, a reception method, a transmitter, and a transmission method.

BACKGROUND

Power is required to make equipment operate.

Typically, equipment is charged through power feeding from a power supply via a wired line. However, it is troublesome to connect a connector to equipment or insert a plug into a socket every time charging of equipment is performed. Therefore, in recent years, a technology is also known in which equipment is charged through wireless power feeding from a charger (see, for example, Patent Literature 1).

CITATION LIST

Patent Literature

Patent Literature 1: Japanese Laid-open Patent Publication No. 2017-209011

SUMMARY

Technical Problem

However, in a case where equipment is charged through wireless power feeding, all power transmitted from a charger does not necessarily reach the equipment. For example, in a case where a person exists between the equipment and the charger, there is a case where at least part of power transmitted from the charger may collide with the person. In such a case, there is a possibility that not only charging efficiency may degrade, but also power may affect a body (human body) of the person.

Therefore, it is desirable to provide a technology which is capable of improving charging efficiency and reducing a possibility that power may affect a human body upon wireless power feeding.

Solution to Problem

According to the present disclosure, a receiver is provided that includes: a wireless communication unit configured to receive a radio wave transmitted from a transmitter; a display control unit configured to control display of at least one of receiving strength of the radio wave transmitted from the transmitter, at the wireless communication unit or predetermined information in accordance with the receiving strength; and a contactless communication unit configured to receive power wirelessly transmitted from the transmitter in a case where the receiving strength exceeds a threshold.

According to the present disclosure, a reception method at a receiver is provided that includes: receiving a radio wave transmitted from a transmitter; controlling display of at least one of receiving strength of the radio wave transmitted from the transmitter, at the receiver or predetermined information in accordance with the receiving strength; and receiving power wirelessly transmitted from the transmitter in a case where the receiving strength exceeds a threshold.

According to the present disclosure, a transmitter is provided that includes: a wireless communication unit configured to transmit a radio wave to a receiver; and a contactless communication unit configured to wirelessly transmit power to the receiver in a case where receiving strength of the radio wave transmitted to the receiver, at the receiver exceeds a threshold.

According to the present disclosure, a transmission method is provided that includes: transmitting a radio wave to a receiver; and wirelessly transmitting power to the receiver in a case where receiving strength of the radio wave transmitted to the receiver, at the receiver exceeds a threshold.

Advantageous Effects of Invention

As described above, according to the present disclosure, a technology is provided which is capable of improving charging efficiency and reducing a possibility that power may affect a human body upon wireless power feeding. Note that the above effects are not necessarily limited, and it is possible to obtain any of effects described in this specification or other effects that can be detected from this specification together with or instead of the above effects.

BRIEF DESCRIPTION OF DRAWINGS

FIG. 13 is a block diagram illustrating a hardware configuration example of the receiver.

DESCRIPTION OF EMBODIMENTS

Figure 1:
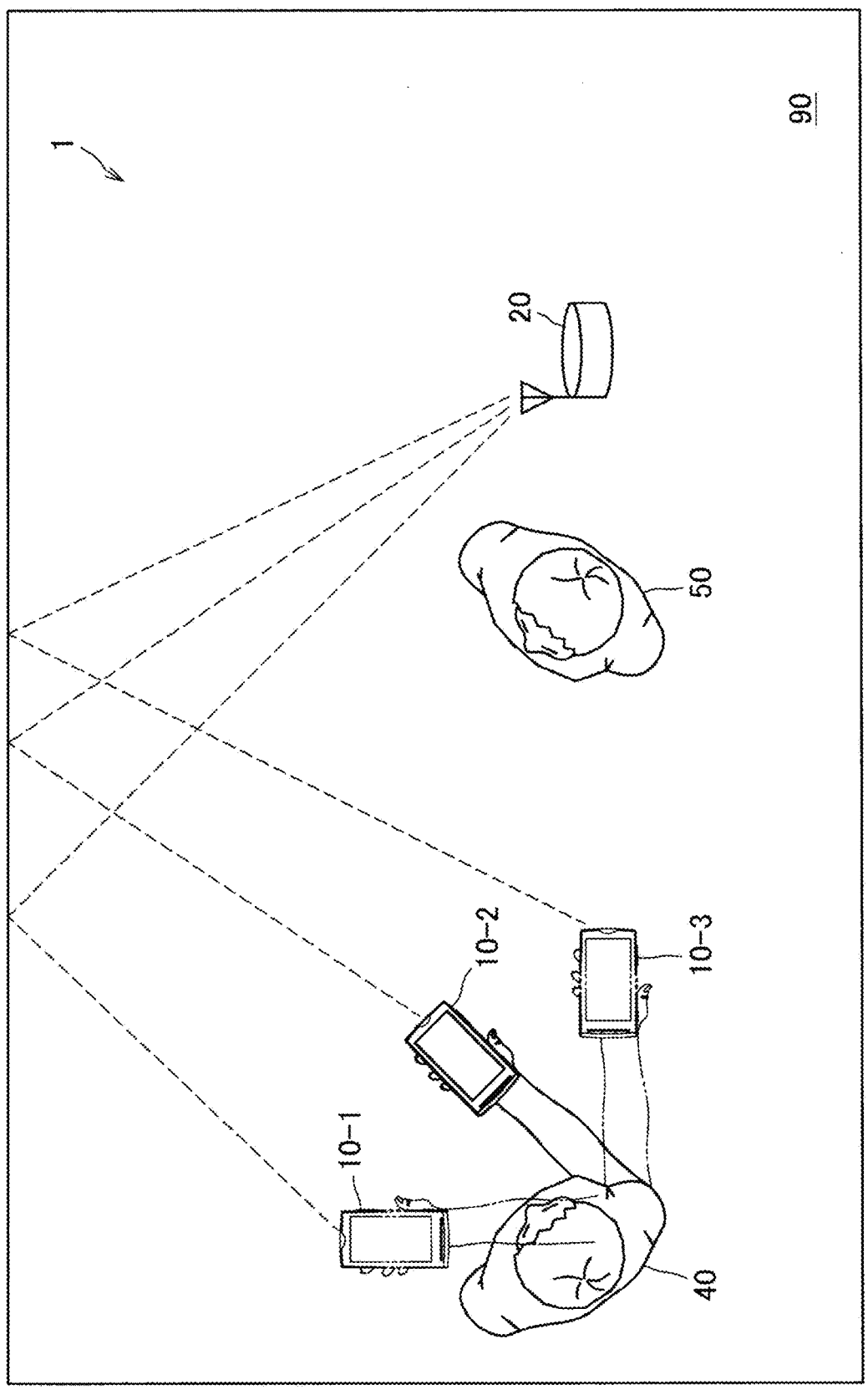
FIG. 1 is a view for explaining outline of a power feeding system according to embodiments of the present disclosure.

Hereinafter, preferred embodiments of the present disclosure will be described in detail with reference to the accompanying drawings. In this specification and the drawings, components having substantially the same functional configuration are denoted by the same reference numerals, and redundant description is omitted.

In addition, in this specification and the drawings, a plurality of structural elements that have substantially the same or similar functional configuration are sometimes distinguished from each other using different numerals after the same reference numerals. However, in the case where there is no need in particular to distinguish the plurality of structural elements that have substantially the same or similar functional configuration, the same reference numeral alone is attached. In addition, similar structural elements according to different embodiments are sometimes distinguished from each other using different alphabets after the same reference numerals. However, in the case where there is no need in particular to distinguish such similar structural elements, the same reference numeral alone is attached.

Note that description will be provided in the following order.

0. Outline
1. First Embodiment
1.1. Functional configuration example of receiver
1.2. Functional configuration example of transmitter
1.3. Details of functions of power feeding system
2. Second Embodiment
2.1. Functional configuration example of receiver
2.2. Functional configuration example of transmitter
2.3. Details of functions of power feeding system
3. Third Embodiment
3.1. Functional configuration example of transmitter
3.2. Details of functions of power feeding system
4. Hardware configuration example
5. Conclusion

0. OUTLINE

FIG. 1 is a view for explaining outline of a power feeding system according to embodiments of the present disclosure. Referring to FIG. 1, a power feeding system 1 exists in real space 90. In an example illustrated in FIG. 1, a case is assumed where the real space 90 is enclosed space (room) enclosed by a floor surface, a wall surface and a ceiling surface. However, the real space 90 does not have to be enclosed space (room). For example, the real space 90 may be space (such as, for example, outdoors) in which part or all is open to outside. The power feeding system 1 includes a receiver (Rx) 10 and a transmitter (Tx) 20.

The transmitter (Tx) 20 can wirelessly transmit power to the receiver (Rx) 10. In this event, the transmitter (Tx) 20 can transmit power while specifying a transmission direction with an antenna having directionality. The receiver (Rx) 10 can receive wireless power feeding by receiving power wirelessly transmitted from the transmitter (Tx) 20. Referring to FIG. 1, in the real space 90, a user 40 who utilizes the receiver (Rx) 10 exists. Then, a person 50 exists between the receiver (Rx) 10 and the transmitter (Tx) 20.

Here, in a case where the receiver (Rx) 10 is charged through wireless power feeding, all the power transmitted from the transmitter (Tx) 20 does not necessarily reach the receiver (Rx) 10. For example, as illustrated in FIG. 1, in a case where the person 50 exists between the receiver (Rx) 10 and the transmitter (Tx) 20, there is a case where at least part of the power transmitted from the transmitter (Tx) 20 collides with the person 50. In such a case, (because power is absorbed or reflected by the person 50), there is not only a possibility that charging efficiency may degrade, but also a possibility that power may affect a body (human body) of the person 50.

Therefore, in the present specification, a technology which is capable of improving charging efficiency and which is capable of reducing a possibility that power may affect a human body upon wireless power feeding will be mainly described.

Specifically, the transmitter (Tx) 20 transmits a radio wave (hereinafter, also referred to as a "beacon") before transmitting power. Then, the user 40 moves the receiver (Rx) 10 until receiving strength of the radio wave at the receiver (Rx) 10 exceeds a threshold. FIG. 1 illustrates a state where the receiver (Rx) 10 is moved by the user 40, and the receiver (Rx) 10 at three time points are indicated as receivers (Rx) 10-1, 10-2, and 10-3. Then, in a case where the receiving strength of the beacon at the receiver (Rx) 10 exceeds the threshold, power is transmitted from the transmitter (Tx) 20.

Referring to FIG. 1, because the receiving strength of the beacon at the receiver (Rx) 10-2 exceeds the threshold, power transmitted from the transmitter (Tx) 20 is received at the receiver (Rx) 10-2. FIG. 1 illustrates an example where a direction of power to be transmitted from the transmitter (Tx) 20 is specified so that the power transmitted from the transmitter (Tx) 20 reaches the receiver (Rx) 10-2 after being reflected by the wall surface. Such specification of the transmission direction of power will be described in detail later.

Outline of the embodiments of the present disclosure has been described above.

1. FIRST EMBODIMENT

Subsequently, the first embodiment of the present disclosure will be described.

[1.1. Functional Configuration Example of Receiver]

Figure 2:
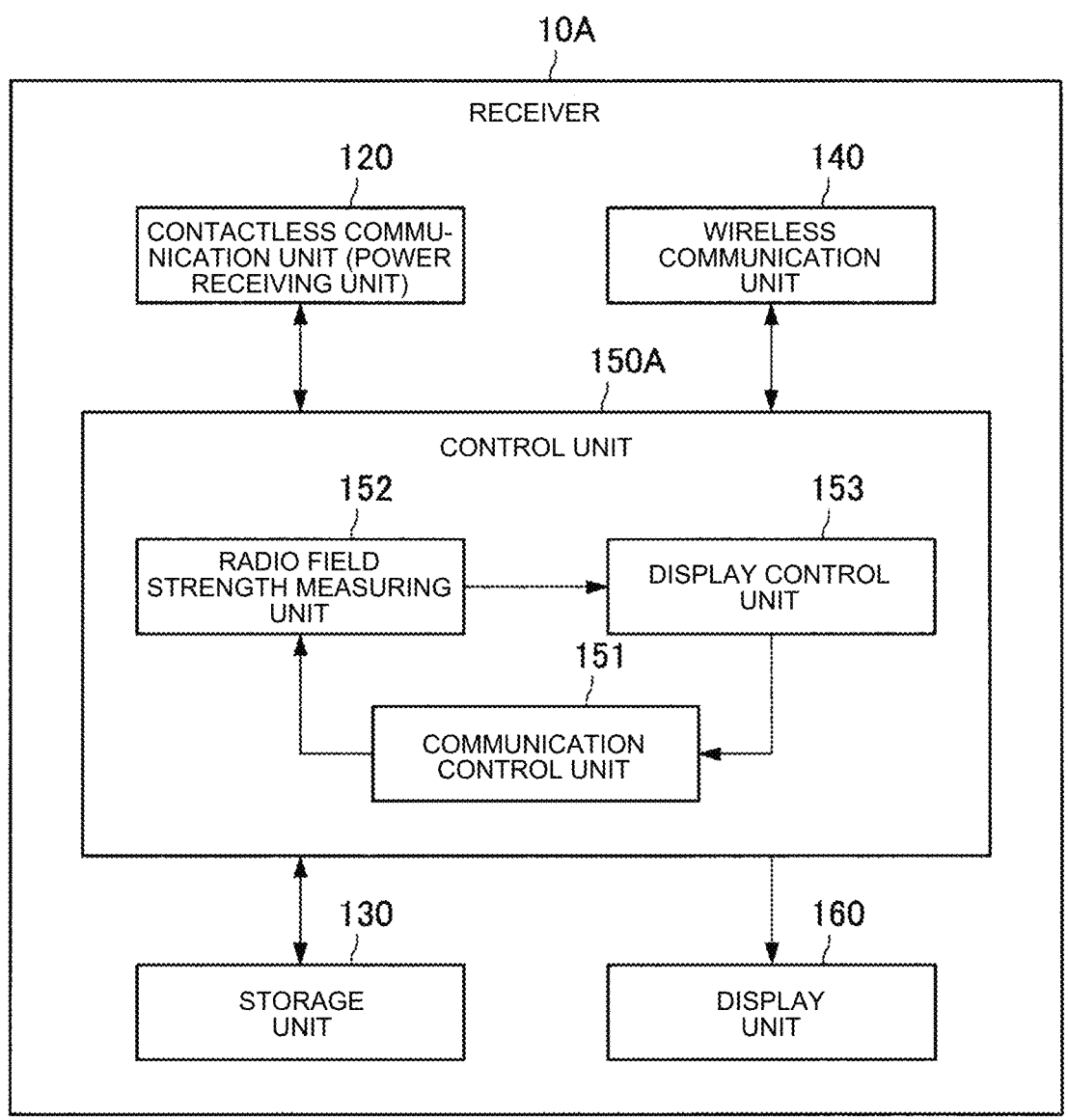
FIG. 2 is a view illustrating a functional configuration example of a receiver according to a first embodiment of the present disclosure.

First, a functional configuration example of a receiver (Rx) according to the first embodiment of the present disclosure will be described. FIG. 2 is a view illustrating the functional configuration example of the receiver (Rx) according to the first embodiment of the present disclosure. As illustrated in FIG. 2, a receiver (Rx) 10A according to the first embodiment of the present disclosure includes a contactless communication unit 120 (power receiving unit), a storage unit 130, a wireless communication unit 140, a control unit 150A, and a display unit 160.

Note that, in the present specification, an example where the contactless communication unit 120 (power receiving unit), the storage unit 130, the wireless communication unit 140, the control unit 150A, and the display unit 160 exist inside the same device (receiver (Rx) 10A) will be mainly described. However, positions at which these blocks exist are not particularly limited. For example, part of these blocks may exist at a server, or the like.

The contactless communication unit 120 includes a communication circuit and receives wireless power feeding by receiving power wirelessly transmitted from a transmitter (Tx) 20A. Any scheme may be used as a wireless power feeding scheme. For example, as a wireless power feeding scheme, a magnetic field coupling scheme may be used, an electric field coupling scheme may be used, or an evanescent wave scheme may be used. As the magnetic field coupling scheme, an electromagnetic induction scheme may be used, or a magnetic field resonance scheme may be used.

The storage unit 130 is a recording medium which stores a program to be executed by the control unit 150A or stores data required for execution of a program. Further, the storage unit 130 temporarily stores data for operation by the control unit 150A. The storage unit 130 may be a magnetic storage device, a semiconductor storage device, an optical storage device or a magnetooptical storage device.

The wireless communication unit 140 includes a communication circuit, and has a function of performing communication with the transmitter (Tx) 20A. For example, the wireless communication unit 140 has a function of receiving a beacon from the transmitter (Tx) 20A. In the first embodiment of the present disclosure, a case will be assumed where the wireless communication unit 140 includes an antenna which wirelessly receives a beacon from the transmitter (Tx) 20A. Further, in the first embodiment of the present disclosure, a case will be assumed where the wireless communication unit 140 receives a beacon from the transmitter (Tx) through near field communication such as Bluetooth (registered trademark).

The control unit 150A executes control of respective units of the receiver (Rx) 10A. As illustrated in FIG. 2, the control unit 150A includes a communication control unit 151, a radio field strength measuring unit 152, and a display control unit 153. These respective functional blocks will be described in detail later. Note that the control unit 150A may be constituted with, for example, a central processing unit (CPU), or the like. In a case where the control unit 150A is constituted with a processing apparatus such as a CPU, such a processing apparatus may be constituted with an electronic circuit.

The display unit 160 displays various kinds of information. In the first embodiment of the present disclosure, a case will be mainly assumed where the display unit 160 includes a display which can perform display so as to be viewable by a user. The display may be a liquid crystal display or an organic electro-luminescence (EL) display.

A functional configuration example of the receiver (Rx) 10A according to the first embodiment of the present disclosure has been described above.

[1.2. Functional Configuration Example of Transmitter]

Figure 3:
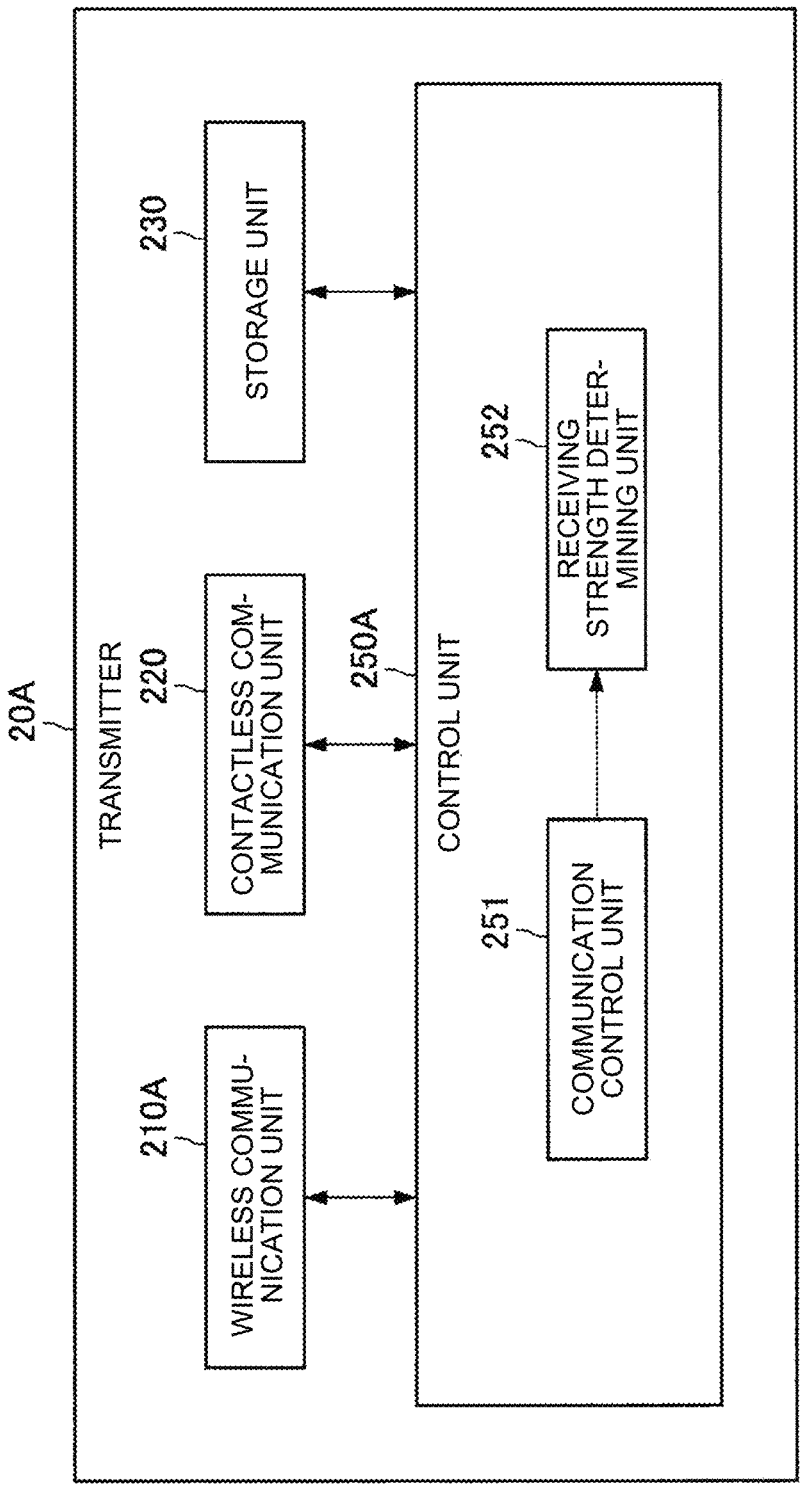
FIG. 3 is a view illustrating a functional configuration example of a transmitter according to the embodiment.

Subsequently, a functional configuration example of a transmitter (Tx) 20A according to the first embodiment of the present disclosure will be described. FIG. 3 is a view illustrating the functional configuration example of the transmitter (Tx) 20A according to the first embodiment of the present disclosure. As illustrated in FIG. 3, the transmitter (Tx) 20A according to the first embodiment of the present disclosure includes a wireless communication unit 210A, a contactless communication unit 220, a storage unit 230, and a control unit 250A.

Note that, in the present specification, an example will be mainly described where the wireless communication unit 210A, the contactless communication unit 220, the storage unit 230, and the control unit 250A exist inside the same device (transmitter (Tx) 20A). However, positions at which these blocks exist are not particularly limited. For example, part of these blocks may exist at a server, or the like.

The wireless communication unit 210A includes a communication circuit and has a function of performing communication with the receiver (Rx) 10A. For example, the wireless communication unit 210A has a function of transmitting a beacon to the receiver (Rx) 10A. In the first embodiment of the present disclosure, a case will be assumed where the wireless communication unit 210A includes an antenna (such as, for example, an array antenna) having directionality which wirelessly transmits a beacon to the receiver (Rx) 10A. Further, in the first embodiment of the present disclosure, a case will be assumed where the wireless communication unit 210A transmits a beacon to the receiver (Rx) 10A through near field communication such as Bluetooth (registered trademark).

The contactless communication unit 220 includes a communication circuit and performs wireless power feeding by wirelessly transmitting power to the receiver (Rx) 10A. As described above, any scheme may be used as a wireless power feeding scheme. For example, as a wireless power feeding scheme, a magnetic field coupling scheme may be used, an electric field coupling scheme may be used, or an evanescent wave scheme may be used. As the magnetic field coupling scheme, an electromagnetic induction scheme may be used, or a magnetic field resonance scheme may be used.

The storage unit 230 is a recording medium which stores a program to be executed by the control unit 250A or stores data required for execution of a program. Further, the storage unit 230 temporarily stores data for operation by the control unit 250A. The storage unit 230 may be a magnetic storage device, a semiconductor storage device, an optical storage device or a magnetooptical storage device.

The control unit 250A executes control of respective units of the transmitter (Tx) 20A. As illustrated in FIG. 3, the control unit 250A includes a communication control unit 251 and a receiving strength determining unit 252. These respective functional blocks will be described in detail later. Note that the control unit 250A may be constituted with, for example, a central processing unit (CPU), or the like. In a case where the control unit 250A is constituted with a processing apparatus such as a CPU, such a processing apparatus may be constituted with an electronic circuit.

A functional configuration example of the transmitter (Tx) 20A according to the first embodiment of the present disclosure has been described above.

[1.3. Details of Functions of Power Feeding System]

Figure 4:
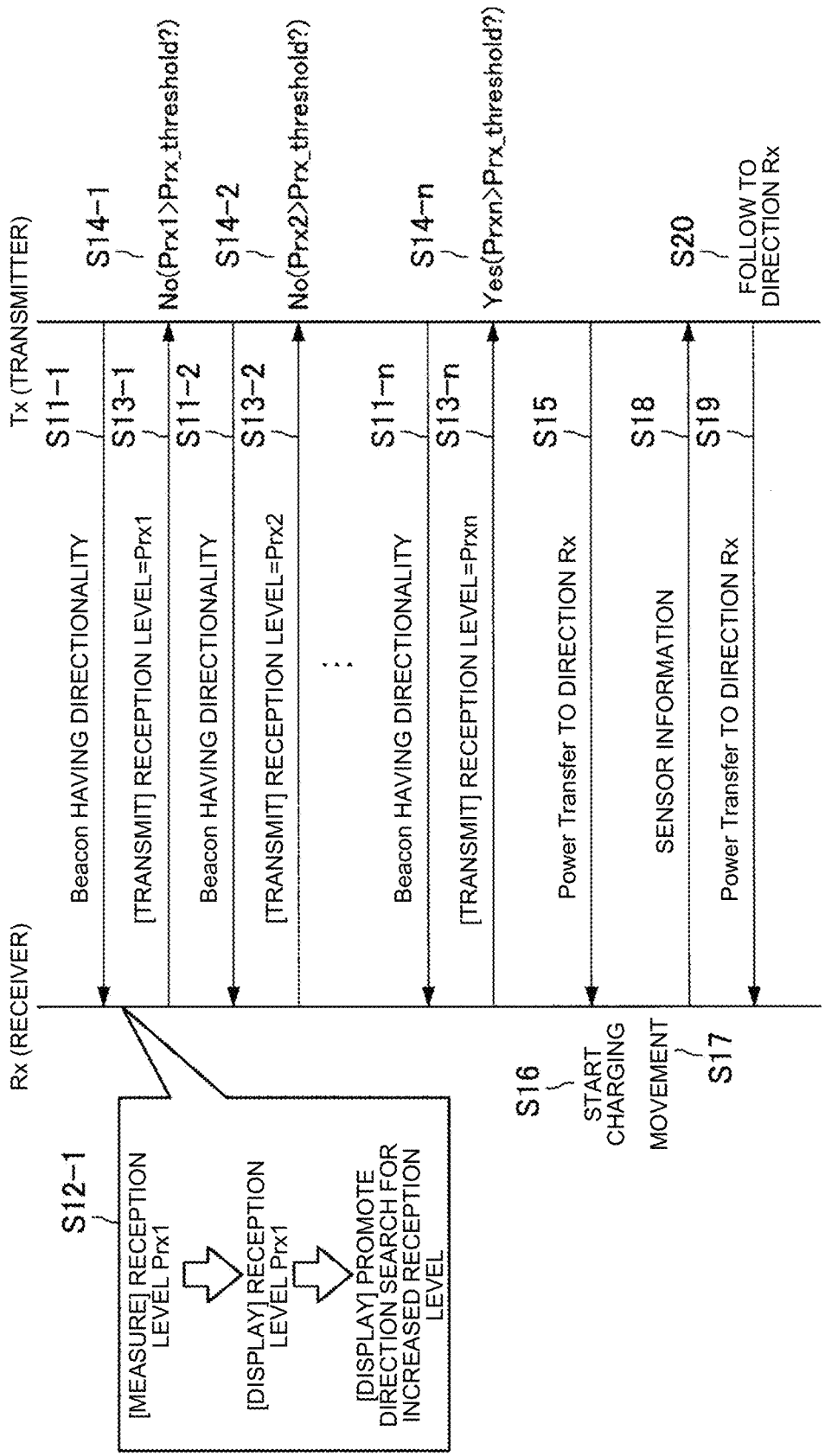
FIG. 4 is a sequence diagram illustrating an operation example of a power feeding system according to the embodiment.

Subsequently, functions of the power feeding system according to the first embodiment of the present disclosure will be described in detail. FIG. 4 is a sequence diagram illustrating an operation example of a power feeding system according to the first embodiment of the present disclosure. Description will be provided with reference to FIG. 1 to FIG. 3 in addition to FIG. 4 as appropriate. First, at the transmitter (Tx), the wireless communication unit 210A transmits a beacon having directionality in accordance with control by the communication control unit 251 (S11-1). In this event, a transmission direction of the beacon may be an arbitrary direction. At the receiver (Rx), the beacon is received by the wireless communication unit 140.

The radio field strength measuring unit 152 measures receiving strength of the beacon received by the wireless communication unit 140, at the wireless communication unit 210A (S12-1). Then, the display control unit 153 controls the display unit 160 so that the receiving strength of the beacon transmitted from the transmitter (Tx), at the wireless communication unit 140, is displayed by the display unit 160. Alternatively, the display control unit 153 may control the display unit 160 so that predetermined information in accordance with the receiving strength is displayed by the display unit 160. Alternatively, the display control unit 153 may control the display unit 160 so that the receiving strength and the predetermined information in accordance with the receiving strength are displayed together by the display unit 160.

Here, the predetermined information is not particularly limited. For example, the display control unit 153 may perform control to display a reception level corresponding to the receiving strength as the predetermined information. The reception level may be divided into any number of stages. That is, the reception level may include two stages, or may include equal to or more than three stages. Note that distance information recognized from the receiving strength may be used as the reception level. For example, relationship between the receiving strength and the distance satisfies relationship that the receiving strength is inversely proportional to a square of the distance.

Figure 5:
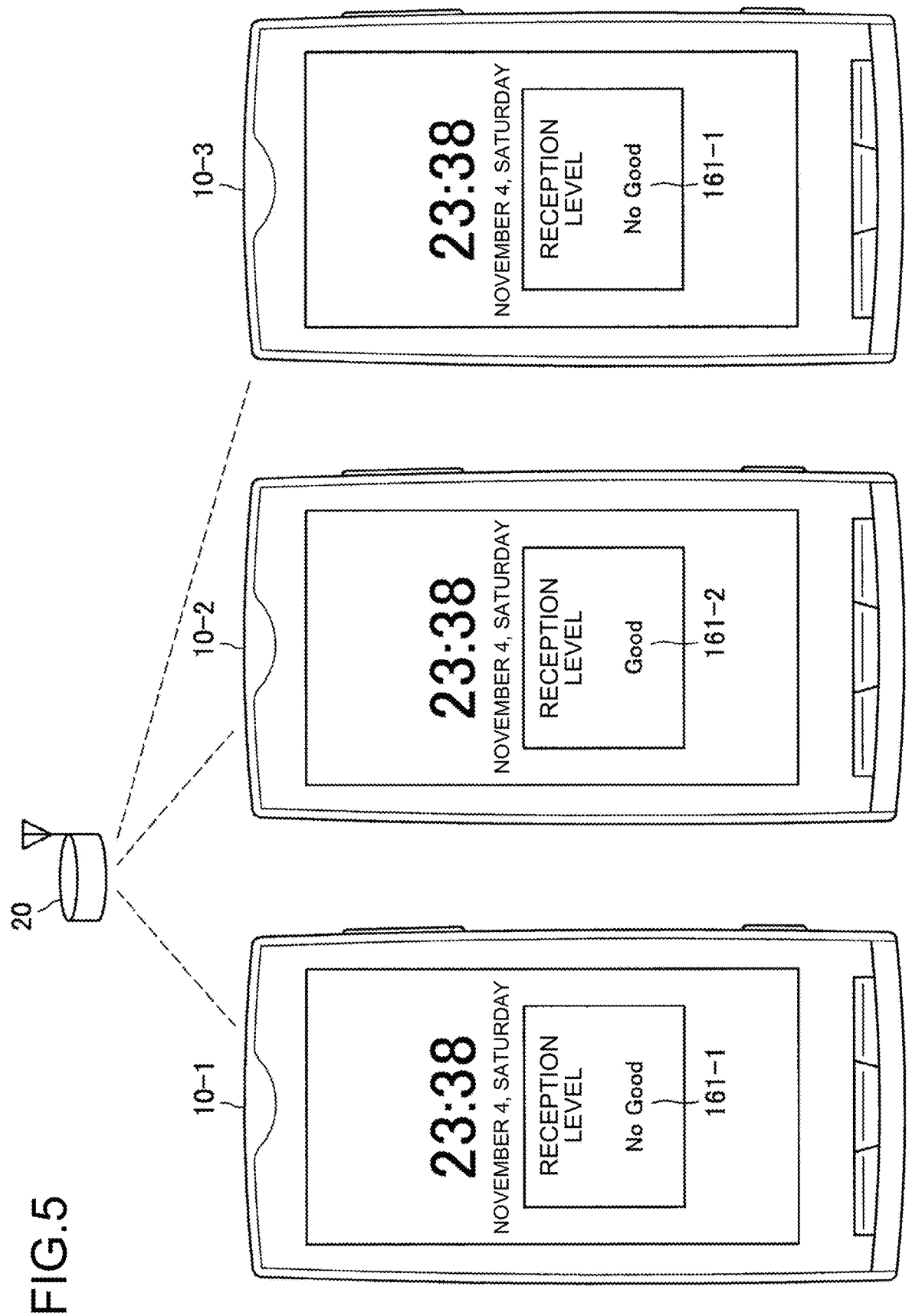
FIG. 5 is a view illustrating a display example of a reception level.

FIG. 5 is a view illustrating a display example of the reception level. FIG. 5 particularly illustrates a case where the reception level includes two stages. Referring to FIG. 5, receivers (Rx) 10-1 to 10-3 are illustrated, and correspond to the receivers (Rx) 10-1 to 10-3 illustrated in FIG. 1.

As can be seen from FIG. 1, the beacon transmitted from the transmitter (Tx) 20 reaches the receiver (Rx) 10-1 from a diagonally right forward direction (at a slightly steep angle) based on the receiver (Rx) 10-1. That is, receiving strength of the beacon transmitted from the transmitter (Tx) 20, at the receiver (Rx) 10-1 corresponds to a low reception level. Therefore, the display control unit 153 may perform control to display a low reception level (in the example illustrated in FIG. 5, a character string 161-1 of "No Good"). The user who sees such display tries to move the receiver (Rx) 10-1 to increase the reception level.

In addition, as can be seen from FIG. 1, the beacon transmitted from the transmitter (Tx) 20 reaches the receiver (Rx) 10-3 from a diagonally left forward direction (at a very steep angle) based on the receiver (Rx) 10-3. That is, receiving strength of the beacon transmitted from the transmitter (Tx) 20, at the receiver (Rx) 10-3 corresponds to a low reception level. Therefore, the display control unit 153 may perform control to display a low reception level (in the example illustrated in FIG. 5, a character string 161-1 of "No Good"). The user who sees such display tries to move the receiver (Rx) 10-1 to increase the reception level.

On the other hand, as can be seen from FIG. 1, the beacon transmitted from the transmitter (Tx) 20 reaches the receiver (Rx) 10-2 from a nearly forward direction (at a gentle angle) based on the receiver (Rx) 10-2. That is, receiving strength of the beacon transmitted from the transmitter (Tx) 20, at the receiver (Rx) 10-2 corresponds to a high reception level. Therefore, the display control unit 153 may perform control to display a high reception level (in the example illustrated in FIG. 5, a character string 161-2 of "Good"). The user who sees such display tries to keep the receiver (Rx) 10-1 at that position.

Figure 6:
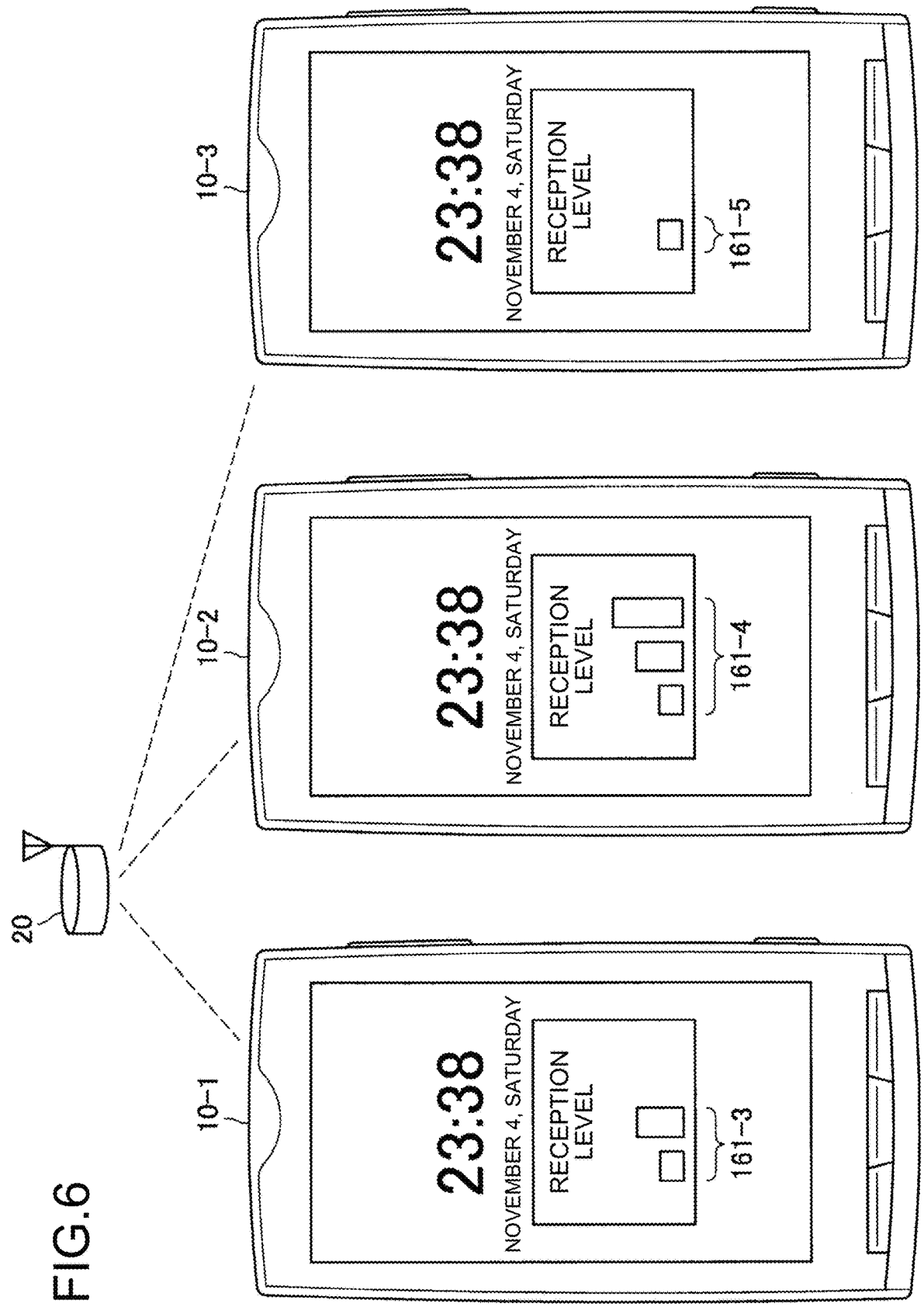
FIG. 6 is a view illustrating another display example of the reception level.

FIG. 6 is a view illustrating another display example of the reception level. FIG. 6 particularly illustrates a case where the reception level includes four stages (strong, slightly weak, weak, very weak). Referring to FIG. 6, similar to FIG. 5, receivers (Rx) 10-1 to 10-3 are illustrated, and correspond to the receivers (Rx) 10-1 to 10-3 illustrated in FIG. 1.

As can be seen from FIG. 1, the beacon transmitted from the transmitter (Tx) 20 reaches the receiver (Rx) 10-1 from a diagonally right forward direction (at a slightly steep angle) based on the receiver (Rx) 10-1. That is, receiving strength of the beacon transmitted from the transmitter (Tx) 20, at the receiver (Rx) 10-1 corresponds to a reception level of "slightly weak". Therefore, the display control unit 153 may perform control to display a reception level of "slightly weak" (in the example illustrated in FIG. 6, two bars 161-3). The user who sees such display tries to move the receiver (Rx) 10-1 to increase the reception level.

In addition, as can be seen from FIG. 1, the beacon transmitted from the transmitter (Tx) 20 reaches the receiver (Rx) 10-3 from a diagonally left forward direction (at a very steep angle) based on the receiver (Rx) 10-3. That is, receiving strength of the beacon transmitted from the transmitter (Tx) 20, at the receiver (Rx) 10-3 corresponds to a reception level of "very weak". Therefore, the display control unit 153 may perform control to display a reception level of "very weak" (in the example illustrated in FIG. 6, one bar 161-5). The user who sees such display tries to move the receiver (Rx) 10-1 to increase the reception level.

On the other hand, as can be seen from FIG. 1, the beacon transmitted from the transmitter (Tx) 20 reaches the receiver (Rx) 10-2 from a nearly forward direction (at a gentle angle) based on the receiver (Rx) 10-2. That is, receiving strength of the beacon transmitted from the transmitter (Tx) 20, at the receiver (Rx) 10-2 corresponds to a reception level of "strong". Therefore, the display control unit 153 may perform control to display a reception level of "strong" (in the example illustrated in FIG. 6, three bars 161-4). The user who sees such display tries to keep the receiver (Rx) 10-1 at that position.

Alternatively, the display control unit 153 may control display of information in accordance with a direction in which the transmitter (Tx) 20 exists as the predetermined information. For example, the display control unit 153 may specify the direction in which the transmitter (Tx) 20 exists and may cause a direction to which the receiver (Rx) is to be moved to be displayed with an arrow to cause the direction of the receiver (Rx) to match the direction in which the transmitter (Tx) 20 exists. In this event, a distance by which the receiver (Rx) is to be moved may be expressed with a length of the arrow. Note that the direction in which the transmitter (Tx) 20 exists may be detected using any method. For example, in a case where the wireless communication unit 140 includes an antenna having directionality (such as, for example, an array antenna), the direction in which the transmitter (Tx) 20 exists can be detected on the basis of a direction in which the beacon is received by the antenna.

Figure 7:
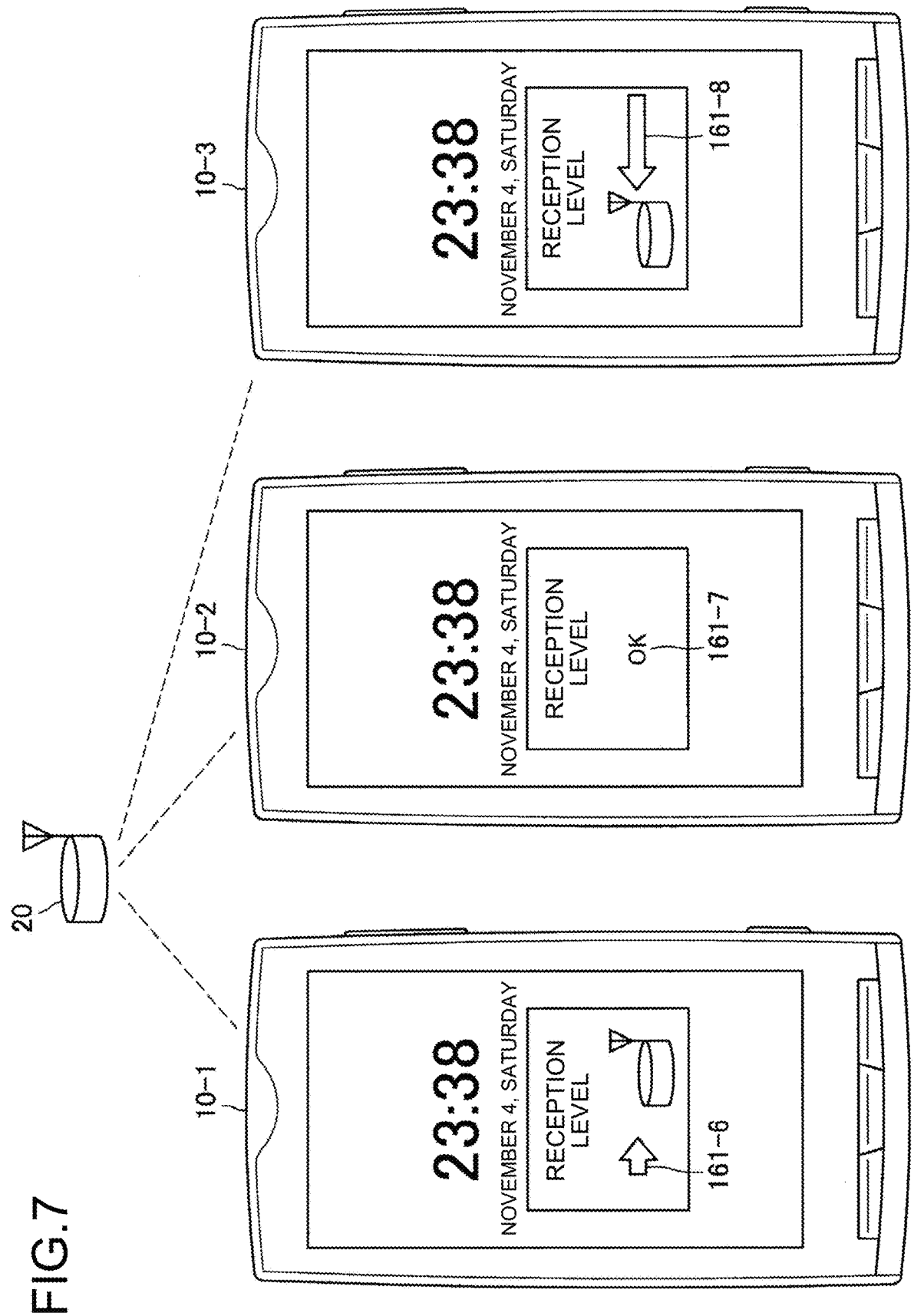
FIG. 7 is a view illustrating a display example of information in accordance with a direction in which the transmitter exists.

FIG. 7 is a view illustrating a display example of information in accordance with a direction in which the transmitter (Tx) 20 exists. Referring to FIG. 7, receivers (Rx) 10-1 to 10-3 are illustrated, and correspond to the receivers (Rx) 10-1 to 10-3 illustrated in FIG. 1.

As can be seen from FIG. 1, the beacon transmitted from the transmitter (Tx) 20 reaches the receiver (Rx) 10-1 from a diagonally right forward direction (at a slightly steep angle) based on the receiver (Rx) 10-1. Therefore, because the receiver (Rx) should be moved to slightly rightward so that the direction of the receiver (Rx) matches the direction in which the transmitter (Tx) 20 exists, the display control unit 153 may perform control to display a short right arrow 161-6. The user who sees such display tries to move the receiver (Rx) slightly rightward to increase the reception level.

In addition, as can be seen from FIG. 1, the beacon transmitted from the transmitter (Tx) 20 reaches the receiver (Rx) 10-3 from a diagonally left forward direction (at a very steep angle) based on the receiver (Rx) 10-3. Therefore, because the receiver (Rx) should be moved to greatly rightward so that the direction of the receiver (Rx) matches the direction in which the transmitter (Tx) 20 exists, the display control unit 153 may perform control to display a long right arrow 161-8. The user who sees such display tries to move the receiver (Rx) greatly leftward to increase the reception level.

On the other hand, as can be seen from FIG. 1, the beacon transmitted from the transmitter (Tx) 20 reaches the receiver (Rx) 10-2 from a nearly forward direction (at a gentle angle) based on the receiver (Rx) 10-2. Therefore, because it is not necessary to particularly move the receiver (Rx) to cause the direction of the receiver (Rx) to match the direction in which the transmitter (Tx) 20 exists, the display control unit 153 may perform control to display a character string 161-7 indicating that the reception level is sufficient. The user who sees such display tries to keep the receiver (Rx) 10-2 at that position.

Here, the reception level of the first beacon at the receiver (Rx) is expressed as "Prx1". At the receiver (Rx), the wireless communication unit 140 transmits the reception level (=Prx1) to the transmitter (Tx) in accordance with control by the communication control unit 151 (S13-1). At the transmitter (Tx), the wireless communication unit 210A receives the reception level (=Prx1), and the receiving strength determining unit 252 determines whether or not the reception level (=Prx1) exceeds a threshold (=Prx_threshold).

Here, a case will be assumed where it is determined by the receiving strength determining unit 252 that the reception level (=Prx1) is equal to or lower than the threshold (=Prx_threshold) (S14-1). In such a case, the wireless communication unit 210A transmits a beacon having directionality again (S11-2). In this event, a transmission direction of the beacon may be an arbitrary direction. That is, the transmission direction of the beacon may be the same as the transmission direction of the previous beacon or may be different from the transmission direction of the previous beacon.

Similar to the time when the first beacon is received, the radio field strength measuring unit 152 measures receiving strength of the second beacon received by the wireless communication unit 140, at the wireless communication unit 210A. Then, the display control unit 153 controls the display unit 160 so that at least one of receiving strength of the second beacon transmitted from the transmitter (Tx) 20A, at the wireless communication unit 140 or predetermined information in accordance with the receiving strength is displayed by the display unit 160.

Here, the reception level of the second beacon at the receiver (Rx) is expressed as "Prx2". At the receiver (Rx), the wireless communication unit 140 transmits the reception level (=Prx2) to the transmitter (Tx). At the transmitter (Tx), the wireless communication unit 210A receives the reception level (=Prx2), and the receiving strength determining unit 252 determines whether or not the reception level (=Prx2) exceeds a threshold (=Prx_threshold).

Here, a case will be assumed where it is determined by the receiving strength determining unit 252 that the reception level (=Prx2) is equal to or lower than the threshold (=Prx_threshold) (S14-2). In such a case, the wireless communication unit 210A transmits a beacon having directionality again. It is assumed that, thereafter, the same operation is repeated, and the wireless communication unit 210A transmits the n-th beacon having directionality (S11-n). In this event, a transmission direction of the beacon may be an arbitrary direction. That is, the transmission direction of the beacon may be the same as the transmission direction of the previous beacon or may be different from the transmission direction of the previous beacon.

Similar to the time when the first beacon is received, the radio field strength measuring unit 152 measures receiving strength of the n-th beacon received by the wireless communication unit 140, at the wireless communication unit 210A. Then, the display control unit 153 controls the display unit 160 so that at least one of receiving strength of the n-th beacon transmitted from the transmitter (Tx) 20A, at the wireless communication unit 140 or predetermined information in accordance with the receiving strength is displayed by the display unit 160.

Here, the reception level of the n-th beacon at the receiver (Rx) is expressed as "Prxn". At the receiver (Rx), the wireless communication unit 140 transmits the reception level (=Prxn) to the transmitter (Tx). At the transmitter (Tx), the wireless communication unit 210A receives the reception level (=Prxn), and the receiving strength determining unit 252 determines whether or not the reception level (=Prxn) exceeds a threshold (=Prx_threshold).

Here, a case will be assumed where it is determined by the receiving strength determining unit 252 that the reception level (=Prxn) exceeds the threshold (=Prx_threshold) (S14-n). In such a case, the contactless communication unit 220 wirelessly transmits power to the receiver (Rx) (S15). In this event, the contactless communication unit 220 only has to transmit power in a direction in which the receiver (Rx) exists (hereinafter, also referred to as the "Rx direction") while setting a transmission direction of the previous beacon (the n-th beacon) as the Rx direction.

When, at the receiver (Rx), the contactless communication unit 120 receives the power transmitted from the transmitter (Tx), charging of the receiver (Rx) is started by utilizing the power received by the contactless communication unit 120 (S16). Thereafter, there can be a case where, in association with movement of the user, the receiver (Rx) also moves (S17). In such a case, for example, in a case where a sensor (such as, for example, an acceleration sensor) which detects movement is provided at the receiver (Rx), the wireless communication unit 140 transmits sensor information (such as, for example, acceleration) detected by the sensor to the transmitter (Tx) (S18).

The wireless communication unit 210A receives the sensor information, and the communication control unit 251 calculates a movement amount (a moving direction and a moving distance) of the receiver (Rx) on the basis of the sensor information. Then, the communication control unit 251 specifies a current position of the receiver (Rx) while adding the movement amount of the receiver (Rx) to the position of the receiver (Rx) upon previous power transmission. Here, the position of the receiver (Rx) upon previous power transmission may be detected by the transmitter (Tx) or may be detected by the receiver (Rx).

The communication control unit 251 specifies a new Rx direction on the basis of the specified current position of the receiver (Rx), and the contactless communication unit 220 transmits power in the Rx direction in accordance with control by the communication control unit 251 (S19). By this means, the receiver (Rx) is followed by the transmitter (Tx) (S20).

According to the first embodiment of the present disclosure, if the user sees display of at least one of the receiving strength of the beacon transmitted from the transmitter (Tx), at the receiver (Rx) or predetermined information in accordance with the receiving strength, the user moves the receiver (Rx) so that the receiving strength becomes greater. By this means, a possibility that at least part of the power transmitted from the transmitter (Tx) may collide with a person is reduced. Further, by this means, it is possible to improve charging efficiency and reduce a possibility that power may affect a human body upon wireless power feeding. Still further, according to the first embodiment of the present disclosure, it is possible to easily specify a direction in which power is to be transmitted by utilizing a beacon having directionality.

The first embodiment of the present disclosure has been described.

2. SECOND EMBODIMENT

Subsequently, a second embodiment of the present disclosure will be described. The second embodiment of the present disclosure is different from the first embodiment of the present disclosure in that the power feeding system 1 includes a receiver (Rx) 10B (FIG. 8) in place of the receiver (Rx) 10A, and includes a transmitter (Tx) 20B (FIG. 9) in place of the transmitter (Tx) 20A. Therefore, the receiver (Rx) 10B and the transmitter (Tx) 20B will be mainly described below, and detailed description regarding components in common with the first embodiment of the present disclosure in the second embodiment of the present disclosure will be omitted.

[2.1. Functional Configuration Example of Receiver]

Figure 8:
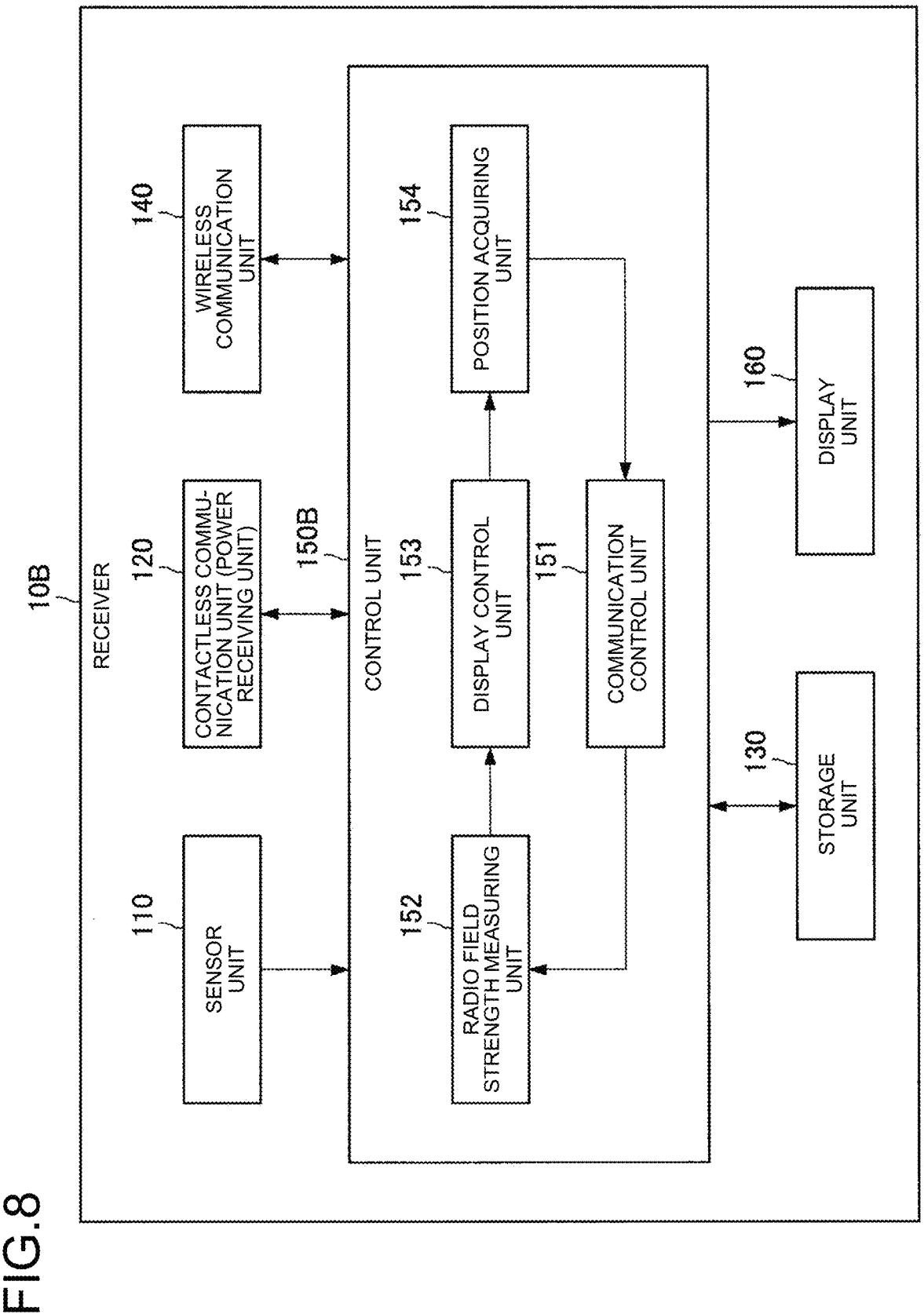
FIG. 8 is a view illustrating a functional configuration example of a receiver according to a second embodiment of the present disclosure.

Subsequently, a functional configuration example of the receiver (Rx) 10B according to the second embodiment of the present disclosure will be described. FIG. 8 is a view illustrating a functional configuration example of the receiver (Rx) 10B according to the second embodiment of the present disclosure. As illustrated in FIG. 8, the receiver (Rx) 10B according to the second embodiment of the present disclosure includes a sensor unit 110 and includes a control unit 150B in place of the control unit 150A compared to the receiver (Rx) 10A (FIG. 2). Therefore, the sensor unit 110 and the control unit 150B will be mainly described below, and detailed description of other components will be omitted.

The sensor unit 110 includes a sensor which detects a position of the receiver (Rx) 10B. The sensor which detects the position of the receiver (Rx) 10B is not particularly limited. For example, the sensor which detects the position of the receiver (Rx) 10B may be a global positioning system (GPS) sensor or may be a sensor which receives a radio signal from a base station. A satellite signal detected by the GPS sensor can be utilized for estimating the position of the receiver (Rx) 10B. Further, receiving strength of the radio signal from the base station can be utilized for an indoor position estimation technology of the receiver (Rx) 10B.

Further, the sensor unit 110 includes a sensor which detects a relative position of a person based on the position of the receiver (Rx) 10B. The sensor which detects a relative position of a person based on the position of the receiver (Rx) 10B may include an image sensor or may include an infrared (IR) sensor. Alternatively, the sensor which detects a relative position of a person may include a microphone or may include a sonar. Alternatively, the sensor which detects a relative position of a person may include a capacitance sensor or may include a pressure sensor. Alternatively, the sensor which detects a relative position of a person may include an odor sensor.

The control unit 150B executes control of respective units of the receiver (Rx) 10B. As illustrated in FIG. 8, the control unit 150B includes a position acquiring unit 154 in addition to the communication control unit 151, the radio field strength measuring unit 152 and the display control unit 153. That is, the control unit 150B additionally includes the position acquiring unit 154 compared to the control unit 150A. Therefore, the position acquiring unit 154 will be mainly described below, and detailed description of the communication control unit 151, the radio field strength measuring unit 152 and the display control unit 153 will be omitted.

A functional configuration example of the receiver (Rx) 10B according to the second embodiment of the present disclosure has been described above.

[2.2. Functional Configuration Example of Transmitter]

Figure 9:
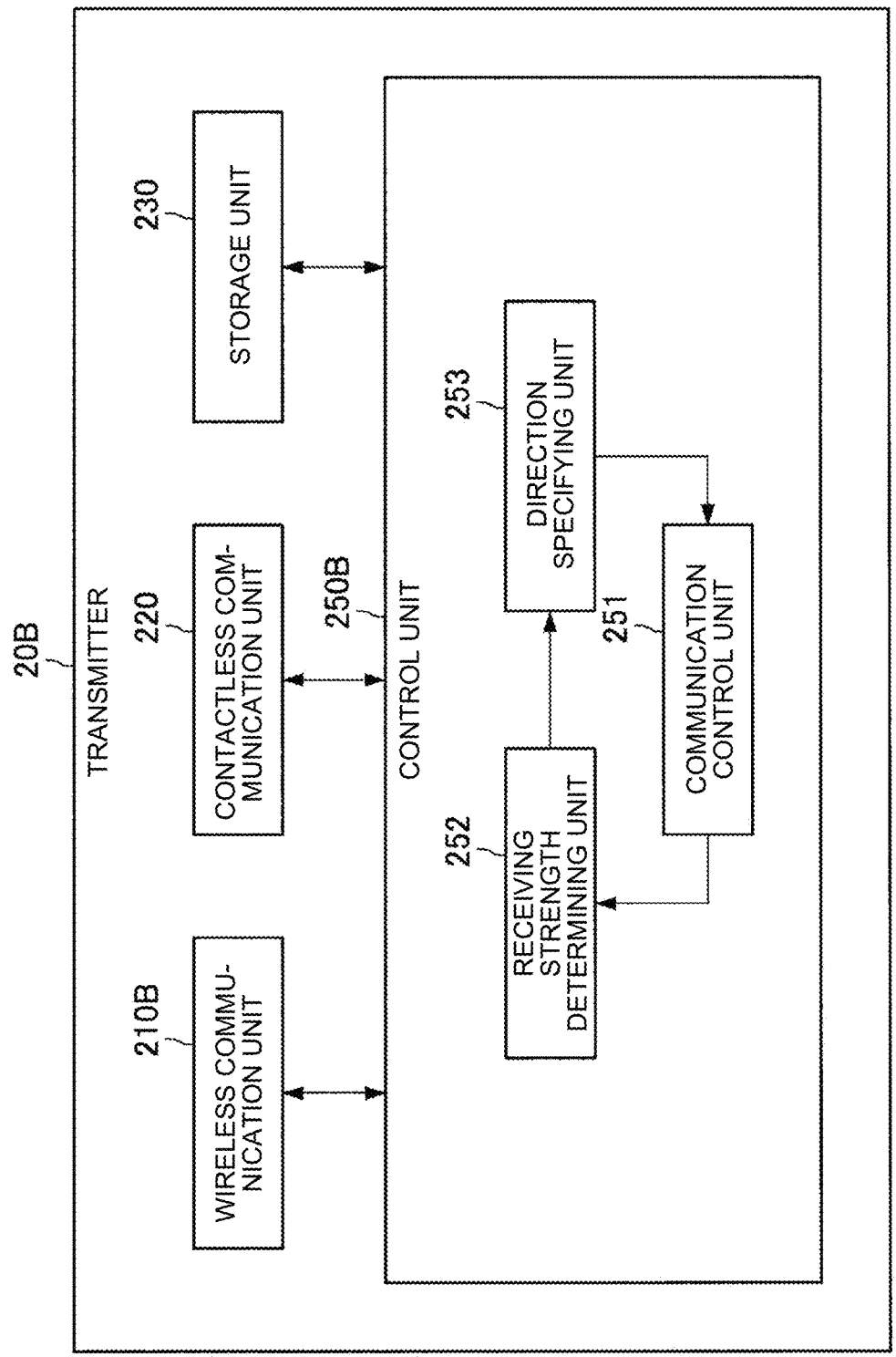
FIG. 9 is a view illustrating a functional configuration example of a transmitter according to the embodiment.

Subsequently, a functional configuration example of the transmitter (Tx) 20B according to the second embodiment of the present disclosure will be described. FIG. 9 is a view illustrating a functional configuration example of a transmitter (Tx) 20B according to the second embodiment of the present disclosure. As illustrated in FIG. 9, the transmitter (Tx) 20B according to the second embodiment of the present disclosure includes a wireless communication unit 210B in place of the wireless communication unit 210A and includes a control unit 250B in place of the control unit 250A compared to the transmitter (Tx) 20A (FIG. 3). Therefore, the wireless communication unit 210B and the control unit 250B will be mainly described below, and detailed description of other components will be omitted.

The wireless communication unit 210B includes a communication circuit and has a function of performing communication with the receiver (Rx) 10A. For example, the wireless communication unit 210B has a function of transmitting a beacon to the receiver (Rx) 10A. In the second embodiment of the present disclosure, a case will be assumed where the wireless communication unit 210A includes a non-directional antenna which wirelessly transmits a beacon to the receiver (Rx) 10A. Further, in the second embodiment of the present disclosure, a case will be assumed where the wireless communication unit 210B transmits a beacon to the receiver (Rx) 10A through near field communication such as Bluetooth (registered trademark).

The control unit 250B executes control of respective units of the transmitter (Tx) 20B. As illustrated in FIG. 9, the control unit 250B includes a direction specifying unit 253 in addition to the communication control unit 251 and the receiving strength determining unit 252. That is, the control unit 250B additionally includes the direction specifying unit 253 compared to the control unit 250A. Therefore, the direction specifying unit 253 will be mainly described below, and detailed description of the communication control unit 251 and the receiving strength determining unit 252 will be omitted.

A functional configuration example of the transmitter (Tx) 20B according to the second embodiment of the present disclosure has been described above.

[2.3. Details of Functions of Power Feeding System]

Figure 10:
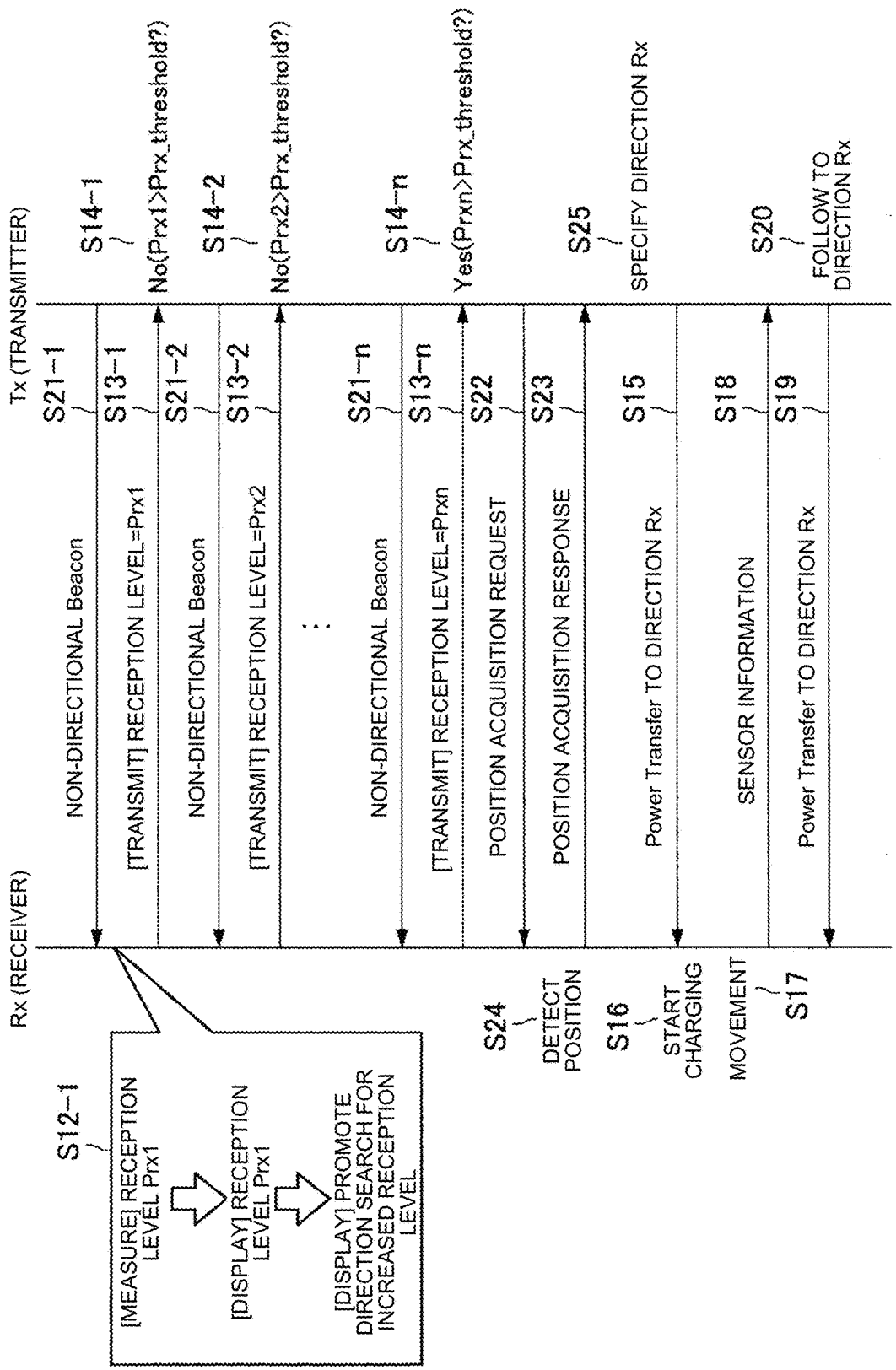
FIG. 10 is a sequence diagram illustrating an operation example of a power feeding system according to the embodiment.

Subsequently, details of functions of the power feeding system according to the second embodiment of the present disclosure will be described. FIG. 10 is a sequence diagram illustrating an operation example of a power feeding system according to the second embodiment of the present disclosure. Description will be provided with reference to FIG. 1, FIG. 8 and FIG. 9 in addition to FIG. 10 as appropriate. In the second embodiment of the present disclosure, at the transmitter (Tx), the wireless communication unit 210B transmits a non-directional beacon in place of a beacon having directionality in accordance with control by the communication control unit 251 (S21-1, S21-2, S21-3).

Similar to the first embodiment of the present disclosure, a case will be assumed where it is determined by the receiving strength determining unit 252 that the reception level (=Prxn) exceeds the threshold (=Prx_threshold) (S14- n). In such a case, the wireless communication unit 210B transmits a position acquisition request to grasp a direction in which the receiver (Rx) exists (S22). At the receiver (Rx), the wireless communication unit 140 receives the position acquisition request. The position acquiring unit 154 acquires the position of the receiver (Rx) on the basis of the sensor information detected by the above-described sensor which detects the position of the receiver (Rx) 10B (S24).

Further, the position acquiring unit 154 acquires the position of the receiver (Rx) on the basis of the sensor information detected by the sensor which detects a relative position of a person based on the position of the receiver (Rx). For example, in a case where the sensor which detects a relative position of a person includes an image sensor, a relative position of a person may be acquired on the basis of a position of at least part (such as, for example, the face) of a human body of the person in an image detected by the image sensor.

Alternatively, in a case where the sensor which detects a relative position of a person includes an IR sensor, and in a case where a temperature of a human body of a person is detected by the IR sensor, a relative position of the person may be acquired on the basis of a position at which the temperature of the human body of the person is detected. The IR sensor can be also utilized to detect heat of the receiver (Rx). That is, it may be set such that, in a case where the temperature detected by the IR sensor is greater than a threshold, charging is not performed.

In a case where the sensor which detects a relative position of a person includes a microphone, a relative position of a person may be acquired on the basis of intensity and a direction of speaking voice of the person detected by the microphone. Alternatively, in a case where the sensor which detects a relative position of a person includes a microphone, a relative position of a person may be acquired using artificial intelligence on the basis of sound of movement of the person (such as, for example, footsteps) detected by the microphone. In a case where the sensor which detects a relative position of a person includes a sonar, a relative position of a person may be acquired on the basis of intensity and a direction of an ultrasonic wave detected by the sonar.

Alternatively, in a case where the sensor which detects a relative position of a person includes a capacitance sensor or a pressure sensor, a relative position of a person may be acquired on the basis of detected intensity and a detection direction by the capacitance sensor or the pressure sensor. Alternatively, in a case where the sensor which detects a relative position of a person includes an odor sensor, a relative position of a person may be acquired on the basis of detected intensity and a detection direction of a predetermined substance emitted from the person, by the odor sensor.

Note that the position of the person may be detected using other methods. For example, in a case where a pressure sensor is embedded into a floor, the position of the person may be acquired on the basis of a position at which a pressure is detected by the pressure sensor embedded into the floor. Alternatively, in a case where a sensor (such as, for example, a position detection sensor) is embedded into an item (such as, for example, shoes, glasses, clothes and a belt) which is worn on a human body, a position of a person may be acquired on the basis of a position detected by the sensor embedded into the item which is worn.

Alternatively, in a case where a camera is provided in an environment (such as, for example, a ceiling) around the receiver (Rx) 10B and a person, a position of the person may be acquired on the basis of a position of at least part (such as, for example, the face) of a human body of the person in an image captured by the camera.

Alternatively, a relative position of a person and a relative position of the receiver (Rx) 10B based on a position of the transmitter (Tx) (that is, a position of the receiver (Rx) 10B based on the position of the transmitter (Tx)) may be specified on the basis of a map of a room created using simultaneous localization and mapping (SLAM). In this event, in a case where the room is divided into a plurality of areas in advance, and a pattern of a direction of a person and a direction of the transmitter (Tx) is determined for each area, a relative position of a person and a relative position of the transmitter (Tx) may be specified on the basis of this pattern.

The wireless communication unit 140 transmits a position acquisition response including the position of the receiver (Rx) 10B and the relative position of the person based on the position of the receiver (Rx) 10B to the transmitter (Tx) (S23). At the transmitter (Tx), the wireless communication unit 210B receives the position of the receiver (Rx) 10B and the relative position of the person based on the position of the receiver (Rx) 10B, and the direction specifying unit 253 calculates the position of the person on the basis of the position of the receiver (Rx) and the relative position of the person. Then, the direction specifying unit 253 calculates a route from the transmitter (Tx) to the receiver (Rx) on the basis of the position of the receiver (Rx) and the position of the person. In this event, the direction specifying unit 253 may calculate a shortest route by taking into account reflection or absorption by the person. Further, the direction specifying unit 253 may calculate the shortest route by further taking into account reflection by the wall surface.

The contactless communication unit 220 wirelessly transmits power in a direction along the route calculated by the direction specifying unit 253 (S15). The subsequent operation can be executed in a similar manner to the first embodiment of the present disclosure.

According to the second embodiment of the present disclosure, in a similar manner to the first embodiment of the present disclosure, a possibility that at least part of power transmitted from the transmitter (Tx) may collide with a person is reduced. Further, by this means, it is possible to improve charging efficiency and reduce a possibility that power may affect a human body upon wireless power feeding. Further, according to the second embodiment of the present disclosure, it is possible to easily specify a direction in which power is to be transmitted on the basis of position information detected by the receiver (Rx) by utilizing a non-directional beacon.

The second embodiment of the present disclosure has been described.

3. THIRD EMBODIMENT

Subsequently, a third embodiment of the present disclosure will be described. The third embodiment of the present disclosure is different from the first embodiment of the present disclosure in that the power feeding system 1 includes a transmitter (Tx) 20C (FIG. 11) in place of the transmitter (Tx) 20A. Therefore, the transmitter (Tx) 20C will be mainly described below, and detailed description regarding components in common with the first embodiment of the present disclosure in the third embodiment of the present disclosure will be omitted.

[3.1. Functional Configuration Example of Transmitter]

Figure 11:
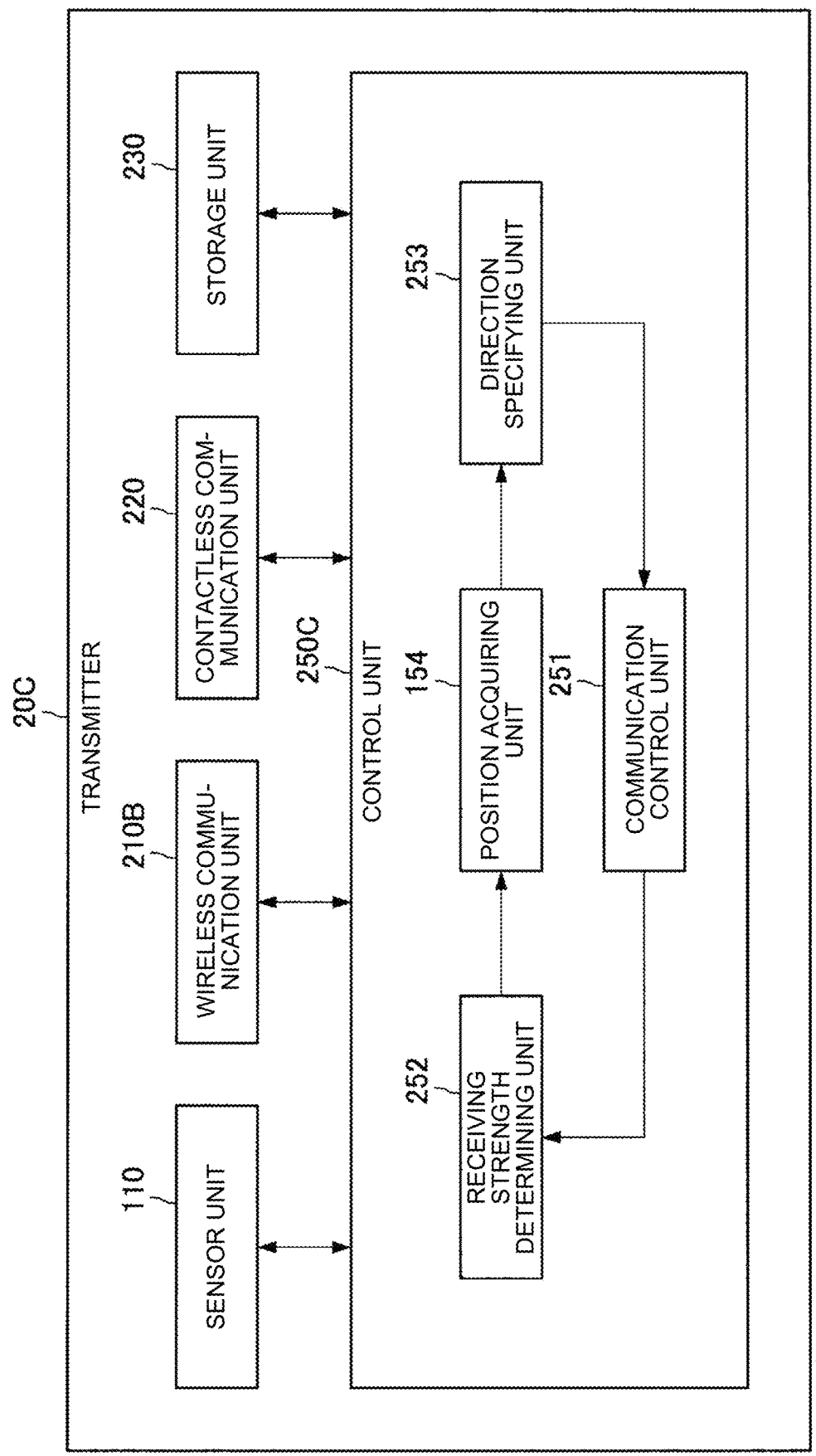
FIG. 11 is a view illustrating a functional configuration example of a transmitter according to a third embodiment of the present disclosure.

Subsequently, a functional configuration example of the transmitter (Tx) 20C according to the third embodiment of the present disclosure will be described. FIG. 11 is a view illustrating a functional configuration example of a transmitter (Tx) 20C according to the third embodiment of the present disclosure. As illustrated in FIG. 11, the transmitter (Tx) 20C according to the third embodiment of the present disclosure includes a sensor unit 110, includes a control unit 150C in place of the control unit 150A, and includes a wireless communication unit 210B in place of the wireless communication unit 210A compared to the transmitter (Tx) 20A (FIG. 3). Therefore, the sensor unit 110, the wireless communication unit 210B and the control unit 150C will be mainly described below, and detailed description of other components will be omitted.

The sensor unit 110 includes a sensor which detects a position of the receiver (Rx) 10A. The sensor which detects the position of the receiver (Rx) 10A is not particularly limited. For example, the sensor which detects the position of the receiver (Rx) 10A may include an image sensor or may include an IR sensor. Alternatively, the sensor which detects the position of the receiver (Rx) 10A may be a sensor which receives a radio signal from the receiver (Rx) 10A. Receiving strength of the radio signal from the receiver (Rx) 10A can be utilized for a technology of estimating an indoor position of the receiver (Rx) 10A.

Further, the sensor unit 110 includes a sensor which detects a position of a person. The sensor which detects a position of a person may include an image sensor or may include an IR sensor. Alternatively, the sensor which detects a position of a person may include a microphone or may include a sonar. Alternatively, the sensor which detects a position of a person may include a capacitance sensor or may include a pressure sensor. Alternatively, the sensor which detects a position of a person may include an odor sensor. Note that, in the third embodiment of the present disclosure, a case will be mainly assumed where the sensor unit 110 is provided at the transmitter (Tx) 20C. In such a case, positions of the receiver (Rx) 10A and a person based on a position of the transmitter (Tx) 20C can be detected. However, the sensor unit 110 may be provided outside the transmitter (Tx) 20C (such as, for example, in a room in which the transmitter (Tx) 20C is provided). In such a case, if the position of the transmitter (Tx) 20C in addition to the respective positions of the receiver (Rx) 10A and a person are detected by the sensor unit 110, positions of the receiver (Rx) 10A and the person based on the position of the transmitter (Tx) 20C can be detected.

A control unit 250C executes control of respective units of the transmitter (Tx) 20C. As illustrated in FIG. 11, the control unit 250C includes the position acquiring unit 154 and a direction specifying unit 253 in addition to the communication control unit 251 and the receiving strength determining unit 252. That is, the control unit 150C additionally includes the position acquiring unit 154 and the direction specifying unit 253 compared to the control unit 150A. Therefore, the position acquiring unit 154 and the direction specifying unit 253 will be mainly described below, and detailed description of the communication control unit 251 and the receiving strength determining unit 252 will be omitted.

A functional configuration example of the transmitter (Tx) 20C according to the third embodiment of the present disclosure has been described above.

[3.2. Details of Functions of Power Feeding System]

Figure 12:
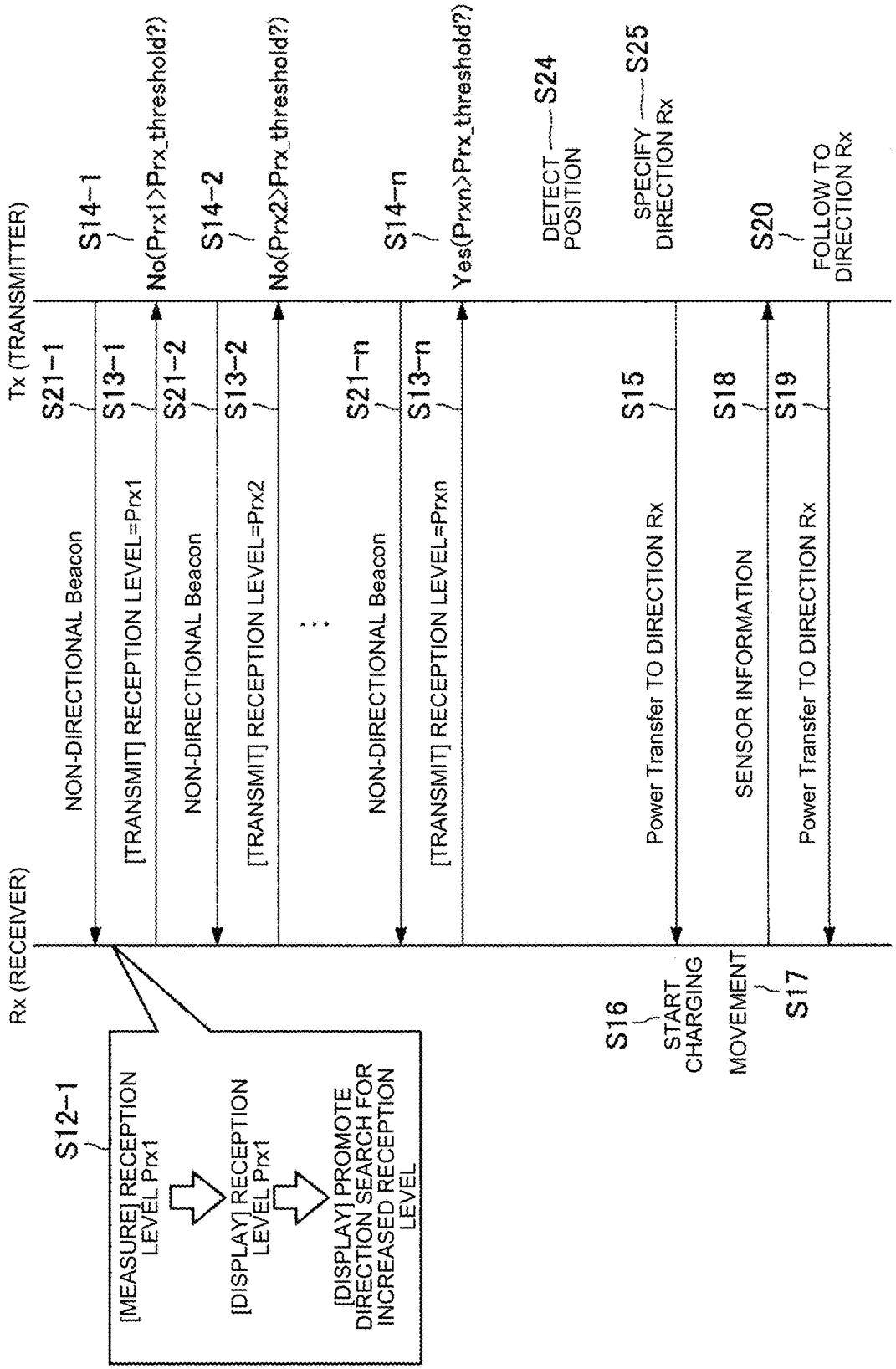
FIG. 12 is a sequence diagram illustrating an operation example of a power feeding system according to the embodiment.

Subsequently, details of functions of the power feeding system according to the third embodiment of the present disclosure will be described. FIG. 12 is a sequence diagram illustrating an operation example of a power feeding system according to the third embodiment of the present disclosure. Description will be provided with reference to FIG. 1, FIG. 2, and FIG. 11 in addition to FIG. 12 as appropriate. In the third embodiment of the present disclosure, at the transmitter (Tx), the wireless communication unit 210B transmits a non-directional beacon in place of a beacon having directionality in accordance with control by the communication control unit 251 (S21-1, S21-2, S21-3).

Similar to the first embodiment of the present disclosure, a case will be assumed where it is determined by the receiving strength determining unit 252 that the reception level (=Prxn) exceeds the threshold (=Prx_threshold) (S14-n). In such a case, the position acquiring unit 154 acquires the position of the receiver (Rx) on the basis of the sensor information detected by the above-described sensor which detects the position of the receiver (Rx) (S24).

Further, the position acquiring unit 154 acquires the position of a person on the basis of the sensor information detected by the sensor which detects a position of a person. For example, in a case where the sensor which detects a position of a person includes an image sensor, a position of a person may be acquired on the basis of a position of at least part (such as, for example, the face) of a human body of the person in an image detected by the image sensor.

Alternatively, in a case where the sensor which detects a position of a person includes an IR sensor, and in a case where a temperature of a human body of a person is detected by the IR sensor, a position of the person may be acquired on the basis of a position at which the temperature of the human body of the person is detected.

In a case where the sensor which detects a position of a person includes a microphone, a position of a person may be acquired on the basis of intensity and a direction of speaking voice of the person detected by the microphone. Alternatively, in a case where the sensor which detects a position of a person includes a microphone, a position of a person may be acquired using artificial intelligence on the basis of sound of movement of the person (such as, for example, footsteps) detected by the microphone. In a case where the sensor which detects a position of a person includes a sonar, a position of a person may be acquired on the basis of intensity and a direction of an ultrasonic wave detected by the sonar.

Alternatively, in a case where the sensor which detects a position of a person includes a capacitance sensor or a pressure sensor, a position of a person may be acquired on the basis of detected intensity and a detection direction by the capacitance sensor or the pressure sensor. Alternatively, in a case where the sensor which detects a position of a person includes an odor sensor, a position of a person may be acquired on the basis of detected intensity and a detection direction of a predetermined substance emitted from the person, by the odor sensor.

Note that a position of a person may be detected using other methods in a similar manner to the second embodiment of the present disclosure. The direction specifying unit 253 calculates a route from the transmitter (Tx) to the receiver (Rx) on the basis of the position of the receiver (Rx) and the position of the person. In this event, the direction specifying unit 253 may calculate a shortest route by taking into account reflection or absorption by the person. Further, the direction specifying unit 253 may calculate the shortest route by further taking into account reflection by the wall surface. Note that an example will be described here where the transmitter (Tx) acquires the respective positions of the person and the receiver (Rx) after receiving the reception level from the receiver (Rx). However, a timing for acquiring the respective positions of the person and the receiver (Rx) is not limited. For example, the transmitter (Tx) may acquire the respective positions of the person and the receiver (Rx) at a timing which is substantially the same as a timing at which a beacon is transmitted from the transmitter (Tx).

The contactless communication unit 220 wirelessly transmits power in a direction along the route calculated by the direction specifying unit 253 (S15). The subsequent operation can be executed in a similar manner to the first embodiment of the present disclosure. However, in the first embodiment of the present disclosure, a configuration has been described where the transmitter (Tx) 20A specifies a current position of the receiver (Rx) 10A on the basis of sensor information detected by the receiver (Rx) 10A, specifies a new Rx direction on the basis of a current position of the receiver (Rx) 10A and transmits power in the specified Rx direction. With such a configuration, the receiver (Rx) 10A can be followed by the transmitter (Tx) 20A. However, in the third embodiment of the present disclosure, the positions of the receiver (Rx) 10A and the person can be detected by the sensor unit 110 of the transmitter (Tx) 20C. Therefore, in the third embodiment of the present disclosure, current positions of the receiver (Rx) 10A and the person may be detected by the sensor unit 110, a new Rx direction may be specified on the basis of the respective current positions of the (Rx) 10A and the person, and power may be transmitter in the specified Rx direction. With such a configuration, the receiver (Rx) 10A can be followed by the transmitter (Tx) 20C.

According to the third embodiment of the present disclosure, in a similar manner to the first embodiment of the present disclosure, a possibility that at least part of power transmitted from the transmitter (Tx) may collide with a person is reduced. Further, by this means, it is possible to improve charging efficiency and reduce a possibility that power may affect a human body upon wireless power feeding. Further, according to the third embodiment of the present disclosure, it is possible to easily specify a direction in which power is to be transmitted on the basis of position information detected by the transmitter (Tx) by utilizing a non-directional beacon.

The third embodiment of the present disclosure has been described.

4. HARDWARE CONFIGURATION EXAMPLE

A hardware configuration of the receiver 10 according to the embodiments of the present disclosure will be described next with reference to FIG. 13. FIG. 13 is a block diagram illustrating a hardware configuration example of the receiver 10 according to the embodiments of the present disclosure. However, the hardware configuration example illustrated in FIG. 13 is merely an example of the receiver 10. Therefore, among the blocks illustrated in FIG. 13, unnecessary components may be deleted. Further, the hardware configuration example illustrated in FIG. 13 may be an example of the hardware configuration of the transmitter (Tx) 20 according to the embodiments of the present disclosure. Also in such a case, among the blocks illustrated in FIG. 13, unnecessary components may be deleted.

As illustrated in FIG. 13, the receiver 10 includes a central processing unit (CPU) 901, read only memory (ROM) 903, and random access memory (RAM) 905. In addition, the receiver 10 includes a host bus 907, a bridge 909, an external bus 911, an interface 913, an input device 915, an output device 917, a storage device 919, a drive 921, a connection port 923, and a communication device 925. Moreover, the receiver 10 includes an imaging device 933 and a sensor 935. The receiver 10 may include a processing circuit such as a digital signal processor (DSP) or an application specific integrated circuit (ASIC), alternatively or in addition to the CPU 901.

The CPU 901 serves as an arithmetic processing device and a control device, and controls the overall operation or a part of the operation of the receiver 10 according to various programs recorded in the ROM 903, the RAM 905, the storage device 919, or a removable recording medium 927. The ROM 903 stores programs, operation parameters, and the like used by the CPU 901. The RAM 905 temporarily stores programs used when the CPU 901 is executed, and parameters that change as appropriate when executing such programs. The CPU 901, the ROM 903, and the RAM 905 are connected with each other via the host bus 907 configured from an internal bus such as a CPU bus. In addition, the host bus 907 is connected to the external bus 911 such as a Peripheral Component Interconnect/Interface (PCI) bus via the bridge 909.

The input device 915 is a device operated by a user such as a button. The input device 915 may include a mouse, a keyboard, a touchscreen, a button, a switch, a lever, and the like. The input device 915 may include a microphone configured to detect voice of users. The input device 915 may be a remote control device that uses, for example, infrared radiation and another type of radio waves. Alternatively, the input device 915 may be external connection equipment 929 such as a mobile phone that corresponds to an operation of the receiver 10. The input device 915 includes an input control circuit that generates input signals on the basis of information which is input by a user to output the generated input signals to the CPU 901. A user inputs various kinds of data and indicates a processing operation to the receiver 10 by operating the input device 915. In addition, the imaging device 933 (to be described later) may function as the input device by capturing an image of movement of hands of a user or capturing a finger of a user. In this case, a pointing position may be decided in accordance with the movement of the hands or a direction of the finger.

The output device 917 includes a device that can visually or audibly report acquired information to a user. The output device 917 may be, for example, a display device such as a liquid crystal display (LCD), an organic electro-luminescence (EL) display, a sound output device such as a speaker or a headphone, or the like. Further, the output device 917 may include a plasma display panel (PDP), a projector, a hologram, a printer, or the like. The output device 917 outputs a result obtained through a process performed by the receiver 10, in the form of text or video such as an image, or as sounds like voice and audio sounds. In addition, the output device 917 may include a light or the like to light the surroundings.

The storage device 919 is a device for data storage that is an example of the storage unit of the receiver 10. The storage device 919 includes, for example, a magnetic storage device such as a hard disk drive (HDD), a semiconductor storage device, an optical storage device, or a magneto-optical storage device. The storage device 919 stores therein programs executed by the CPU 901 and various kinds of data, various kinds of data acquired from an outside, and the like.

The drive 921 is a reader/writer for the removable recording medium 927 such as a magnetic disk, an optical disc, a magneto-optical disk, and a semiconductor memory, and built in or externally attached to the receiver 10. The drive 921 reads out information recorded on the mounted removable recording medium 927, and outputs the information to the RAM 905. The drive 921 writes the record into the mounted removable recording medium 927.

The connection port 923 is a port used to directly connect equipment to the receiver 10. The connection port 923 may be a USB (Universal Serial Bus) port, an IEEE1394 port, and a Small Computer System Interface (SCSI) port, or the like. In addition, the connection port 923 may be an RS-232C port, an optical audio terminal, an HDMI (registered trademark) (High-Definition Multimedia Interface) port, and so on. The connection of the external connection equipment 929 to the connection port 923 makes it possible to exchange various kinds of data between the receiver 10 and the external connection equipment 929.

The communication device 925 is a communication interface including, for example, a communication device for connection to a network 931. The communication device 925 may be, for example, a wired or wireless local area network (LAN), Bluetooth (registered trademark), or a communication card for a wireless USB (WUSB). The communication device 925 may also be, for example, a router for optical communication, a router for asymmetric digital subscriber line (ADSL), or a modem for various kinds of communication. For example, the communication device 925 transmits and receives signals in the Internet or transmits signals to and receives signals from another communication device by using a predetermined protocol such as TCP/IP. The network 931 to which the communication device 925 connects is a network established through wired or wireless connection. The network 931 is, for example, the Internet, a home LAN, infrared communication, radio communication, or satellite communication.

The imaging device 933 is a device that captures images of a real space by using an image sensor such as a charge coupled device (CCD) or a complementary metal oxide semiconductor (CMOS), and various members such as a lens for controlling image formation of a subject image onto the image sensor, and generates the captured images. The imaging device 933 may capture a still image or a moving image.

The sensor 935 is various sensors such as a ranging sensor, an acceleration sensor, a gyro sensor, a geomagnetic sensor, a vibration sensor, an optical sensor, and a sound sensor. The sensor 935 acquires information regarding a state of the receiver 10 such as a posture of a housing of the receiver 10, and information regarding an environment surrounding the receiver 10 such as luminous intensity and noise around the receiver 10. The sensor 935 may include a global positioning system (GPS) sensor that receives GPS signals to measure latitude, longitude, and altitude of the device.

5. CONCLUSION

As described above, according to the embodiments of the present disclosure, when the user sees display of at least one of the receiving strength of the beacon transmitted from the transmitter (Tx), at the receiver (Rx), or predetermined information in accordance with the receiving strength, the user moves the receiver (Rx) so that the receiving strength becomes greater. By this means, a possibility that at least part of the power transmitted from the transmitter (Tx) may collide with a person is reduced. Further, by this means, it is possible to improve charging efficiency and reduce a possibility that power may affect a human body upon wireless power feeding.

The preferred embodiment of the present disclosure has been described above with reference to the accompanying drawings, whilst the technical scope of the present disclosure is not limited to the above examples. A person skilled in the art may find various alterations and modifications within the scope of the appended claims, and it should be understood that they will naturally come under the technical scope of the present disclosure.

For example, a case has been mainly described above where the position of the transmitter (Tx) 20 is fixed, and a power transmission direction is specified by the transmitter (Tx) 20 on the basis of the position of the receiver (Rx) 10, the position of a person, the position of the wall surface, or the like, and power is transmitted from the transmitter (Tx) 20 in the specified transmission direction. However, the transmitter (Tx) 20 may be able to move. In such a case, power may be transmitted from the transmitter (Tx) 20 to the receiver (Rx) 10 after the transmitter (Tx) 20 moves to a position at which power does not collide with a person and a position closest to the receiver (Rx) 10. The transmitter (Tx) 20 can be also mounted on a robot and can be also applied as a transmitter for a factory. Further, the receiver (Rx) 10 may be IoT equipment.

In the second embodiment of the present disclosure, a case has been described where the position of the receiver (Rx) 10B and the position of a person are detected by the receiver (Rx) 10B, and in the third embodiment of the present disclosure, a case has been described where the position of the receiver (Rx) 10A and the position of a person are detected by the transmitter (Tx) 20C. However, the position of the receiver (Rx) 10 may be detected by the receiver (Rx) 10, the position of a person may be detected by the transmitter (Tx) 20, the position of the receiver (Rx) 10 may be detected by the transmitter (Tx) 20, and the position of a person may be detected by the receiver (Rx) 10.

Further, positions of the respective components are not particularly limited if the above-described operation of the receiver (Rx) 10 is realized. As a specific example, part or all of the respective blocks provided at the control unit 150 may exist at a server, or the like. Further, positions of the respective components are not particularly limited if the above-described operation of the transmitter (Tx) 20 is realized. As a specific example, part or all of the respective blocks provided at a control unit 250 may exist at a server, or the like.

Furthermore, it is possible to create a program for causing the hardware such as CPU, ROM and RAM incorporated in the computer to execute functions equivalent to those of the control unit 150 as described above. In addition, a computer-readable recording medium on which the program is recorded can also be provided. Furthermore, it is possible to create a program for causing the hardware such as CPU, ROM and RAM incorporated in the computer to execute functions equivalent to those of the control unit 250 as described above. In addition, a computer-readable recording medium on which the program is recorded can also be provided.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
A receiver comprising:
a wireless communication unit configured to receive a radio wave transmitted from a transmitter;
a display control unit configured to control display of at least one of receiving strength of the radio wave transmitted from the transmitter, at the wireless communication unit or predetermined information in accordance with the receiving strength; and
a contactless communication unit configured to receive power wirelessly transmitted from the transmitter in a case where the receiving strength exceeds a threshold.

(2)
The receiver according to (1),
wherein the display control unit controls display of the receiving strength.

(3)
The receiver according to (1),
wherein the display control unit controls display of a reception level corresponding to the receiving strength as the predetermined information.

(4)
The receiver according to (1),
wherein the display control unit controls display of information in accordance with a direction in which the transmitter exists, as the predetermined information.

(5)
A reception method at a receiver, comprising:
receiving a radio wave transmitted from a transmitter;
controlling display of at least one of receiving strength of the radio wave transmitted from the transmitter, at the receiver or predetermined information in accordance with the receiving strength; and
receiving power wirelessly transmitted from the transmitter in a case where the receiving strength exceeds a threshold.

(6)
A transmitter comprising:
a wireless communication unit configured to transmit a radio wave to a receiver; and
a contactless communication unit configured to wirelessly transmit power to the receiver in a case where receiving strength of the radio wave transmitted to the receiver, at the receiver exceeds a threshold.

(7)
The transmitter according to (6),
wherein the wireless communication unit transmits the radio wave having directionality, and
the contactless communication unit transmits the power in a transmission direction of the radio wave in a case where receiving strength of the radio wave having directionality, at the receiver exceeds a threshold.

(8)
The transmitter according to (6),
wherein the contactless communication unit transmits the power in a direction along a route from the transmitter to the receiver, calculated on a basis of a position of the receiver and a position of a person in a case where the receiving strength exceeds a threshold.

(9)
The transmitter according to (8),
wherein the contactless communication unit transmits the power in a direction along the shortest route calculated while reflection or absorption by the person is taken into account in a case where the receiving strength exceeds a threshold.

(10)
The transmitter according to (9),
wherein the contactless communication unit transmits the power in a direction along the shortest route calculated while reflection by a wall surface is further taken into account in a case where the receiving strength exceeds a threshold.

(11)
The transmitter according to any one of (8) to (10),
wherein the transmitter includes a direction specifying unit configured to calculate the route.

(12)
The transmitter according to any one of (8) to (11),
wherein the position of the person is calculated on a basis of a relative position of the person based on the receiver detected by the receiver and a position of the receiver.

(13)
The transmitter according to any one of (8) to (11),
wherein the position of the person is detected by the transmitter.

(14)
A transmission method comprising:
transmitting a radio wave to a receiver; and
wirelessly transmitting power to the receiver in a case where receiving strength of the radio wave transmitted to the receiver, at the receiver exceeds a threshold.

REFERENCE SIGNS LIST

1 POWER FEEDING SYSTEM
10 (10A, 10B) RECEIVER
110 SENSOR UNIT
120 CONTACTLESS COMMUNICATION UNIT
130 STORAGE UNIT
140 WIRELESS COMMUNICATION UNIT
150 (150A, 150B, 150C) CONTROL UNIT
151 COMMUNICATION CONTROL UNIT
152 RADIO FIELD STRENGTH MEASURING UNIT
153 DISPLAY CONTROL UNIT
154 POSITION ACQUIRING UNIT
160 DISPLAY UNIT
20 (20A, 20B, 20C) TRANSMITTER
210 (210A, 210B) WIRELESS COMMUNICATION UNIT
220 CONTACTLESS COMMUNICATION UNIT
230 STORAGE UNIT
250 (250A, 250B, 250C) CONTROL UNIT
251 COMMUNICATION CONTROL UNIT
252 RECEIVING STRENGTH DETERMINING UNIT
253 DIRECTION SPECIFYING UNIT
40 USER
50 PERSON
90 REAL SPACE

The invention claimed is:
1. A receiver comprising:
a wireless communication circuit including a communication antenna configured to receive a radio wave as a beacon signal transmitted from a transmitter via near field communication, the beacon signal having directionality based on a directionality of the transmitter;
a display control circuit configured to control display of receiving strength, of the directional beacon signal directionally transmitted from the transmitter, at the wireless communication circuit, and predetermined information in accordance with the receiving strength of the directional beacon signal at the wireless communication circuit; and a contactless communication circuit, separate from the wireless communication circuit, configured to receive directional power directionally wirelessly transmitted from the transmitter, responsive to the receiving strength exceeding a threshold, via a wireless power feeding scheme in the form of one of a magnetic field coupling scheme, an electric field coupling scheme, or an evanescent wave scheme, wherein the wireless communication circuit is configured to transmit the receiving strength of the directional beacon signal to the transmitter prior to directionally receiving the directional power wirelessly from the transmitter, wherein the directional power is received by the contactless communication circuit indirectly from the transmitter, and controlled to be transmitted in the same direction as the beacon signal responsive to the receiving strength exceeding the threshold, and wherein the predetermined information includes a direction to move the receiver in order to make the receiving strength of the directional beacon signal at the wireless communication circuit exceed the threshold.

2. The receiver according to claim 1,
wherein the display control circuit controls display of the receiving strength.

3. The receiver according to claim 1,
wherein the display control circuit controls display of a reception level corresponding to the receiving strength as the predetermined information.

4. A reception method at a receiver, comprising:
receiving, by a wireless communication circuit including a communication antenna, a radio wave as a beacon signal transmitted from a transmitter via near field communication, the beacon signal having directionality based on a directionality of the transmitter;
controlling display of at least one of receiving strength, of the directional beacon signal transmitted from the transmitter, at the receiver, or predetermined information in accordance with the receiving strength of the directional beacon signal at the receiver;
transmitting, by the wireless communication circuit, the receiving strength of the directional beacon signal to the transmitter; and
after said transmitting the receiving strength of the directional beacon signal to the transmitter, directionally receiving power wirelessly directionally transmitted from the transmitter by a contactless communication circuit separate from the wireless communication circuit responsive to the receiving strength exceeding a threshold, via a wireless power feeding scheme in the form of one of a magnetic field coupling scheme, an electric field coupling scheme, or an evanescent wave scheme,
wherein the directional power is received indirectly from the transmitter via an intervening reflective object, and controlled to be transmitted in the same direction as the beacon signal responsive to the receiving strength exceeding the threshold.

5. A transmitter comprising:
a wireless communication circuit including a communication antenna configured to
directionally wirelessly transmit a radio wave as a beacon signal to a receiver via near field communication, the beacon signal having directionality based on a directionality of the transmitter, and
wirelessly receive, from the receiver, a receiving strength of the beacon signal at the receiver;

a controller circuit configured to determine whether the receiving strength of the beacon signal at the receiver exceeds a threshold; and a contactless communication circuit, separate from the wireless communication circuit, configured to wirelessly directionally transmit power to the receiver responsive to the receiving strength of the beacon signal directionally wirelessly transmitted to the receiver, at the receiver, being determined to exceed the threshold, via a wireless power feeding scheme in the form of one of a magnetic field coupling scheme, an electric field coupling scheme, or an evanescent wave scheme, wherein the directional power is transmitted so as to be received indirectly by the receiver via an intervening reflective object, and controlled to be transmitted in the same direction as the beacon signal responsive to the receiving strength exceeding the threshold.

6. The transmitter according to claim 5,
wherein the contactless communication circuit wirelessly directionally transmits the power in a direction along an indirect route from the transmitter to the receiver, calculated based on a position of the receiver and a position of a person between the transmitter and the receiver responsive to the receiving strength exceeding the threshold.

7. The transmitter according to claim 6, wherein the contactless communication circuit wirelessly directionally transmits the power in the direction for the indirect route to be the shortest indirect route from the transmitter to the receiver, calculated while reflection or absorption by the person is taken into account, responsive to the receiving strength exceeding the threshold.

8. The transmitter according to claim 7, wherein the contactless communication circuit transmits the power in the direction along the shortest indirect route calculated while reflection by a wall surface as the reflective object is further taken into account, responsive to the receiving strength exceeding the threshold.

9. The transmitter according to claim 6, further comprising a direction specifying circuit configured to calculate the indirect route.

10. The transmitter according to claim 6, wherein the position of the person is calculated based on a relative position of the person based on the receiver detected by the receiver and a position of the receiver.

11. The transmitter according to claim 6, wherein the position of the person is detected by the transmitter.

12. A transmission method at a transmitter comprising:
directionally wirelessly transmitting, by a wireless communication circuit including a communication antenna, a radio wave as a beacon signal to a receiver via near field communication, the beacon signal having directionality based on a directionality of the transmitter;
wirelessly receiving by the wireless communication circuit, from the receiver, a receiving strength of the beacon signal at the receiver;
determining whether the receiving strength of the beacon signal at the receiver exceeds a threshold;
determining a direction to wirelessly directionally transmit power to the receiver responsive to the receiving strength of the beacon signal directionally wirelessly transmitted to the receiver, at the receiver, being determined to exceed the threshold; and
wirelessly directionally transmitting power, by a contactless communication circuit separate from the wireless communication circuit, to the receiver responsive to the receiving strength of the beacon signal directionally wirelessly transmitted to the receiver, at the receiver, being determined to exceed the threshold, via a wireless power feeding scheme in the form of one of a magnetic field coupling scheme, an electric field coupling scheme, or an evanescent wave scheme, wherein the directional power is wirelessly directionally transmitted so as to be received indirectly by the receiver via an intervening reflective object, and controlled to be transmitted in the same direction as the beacon signal responsive to the receiving strength exceeding the threshold.

13. The method according to claim 12, wherein said wirelessly directionally transmitting power to the receiver directionally transmits the power in a direction along an indirect route from the transmitter to the receiver, calculated based on a position of the receiver and a position of a person between the transmitter and the receiver responsive to the receiving strength exceeding the threshold.

14. The method according to claim 13, wherein said wirelessly directionally transmitting power to the receiver wirelessly directionally transmits the power in the direction for the indirect route to be the shortest indirect route from the transmitter to the receiver, calculated while reflection or absorption by the person is taken into account, responsive to the receiving strength exceeding the threshold.

15. The method according to claim 14, wherein said wirelessly directionally transmitting power to the receiver in the direction along the shortest indirect route calculated while reflection by a wall surface as the reflective object is further taken into account, responsive to the receiving strength exceeding the threshold.

\* \* \* \* \*